United States Patent
Naroff et al.

(10) Patent No.: US 8,261,246 B1
(45) Date of Patent: Sep. 4, 2012

(54) METHOD AND SYSTEM FOR DYNAMICALLY POPULATING GROUPS IN A DEVELOPER ENVIRONMENT

(75) Inventors: Steve Naroff, San Jose, CA (US); Steve Lewallen, San Jose, CA (US); Tim Burngarner, Sharpsburg, MD (US)

(73) Assignee: Apple Inc., Cupertino, CA (US)

( * ) Notice: Subject to any disclaimer, the term of this patent is extended or adjusted under 35 U.S.C. 154(b) by 883 days.

(21) Appl. No.: 10/936,233

(22) Filed: Sep. 7, 2004

(51) Int. Cl.
*G06F 9/44* (2006.01)
*G06F 9/45* (2006.01)

(52) U.S. Cl. ........................ 717/140; 717/106

(58) Field of Classification Search .................. None
See application file for complete search history.

(56) References Cited

U.S. PATENT DOCUMENTS

| | | | |
|---|---|---|---|
| 3,990,710 A | 11/1976 | Hughes | |
| 4,528,643 A | 7/1985 | Freeny, Jr. | |
| 4,851,931 A | 7/1989 | Parker et al. | |
| 5,168,481 A | 12/1992 | Culbertson et al. | |
| 5,181,107 A | 1/1993 | Rhoades | |
| 5,191,573 A | 3/1993 | Hair | |
| 5,341,350 A | 8/1994 | Frank et al. | |
| 5,355,302 A | 10/1994 | Martin et al. | |
| 5,418,713 A | 5/1995 | Allen | |
| 5,428,735 A * | 6/1995 | Kahl et al. .................... 715/839 | |
| 5,481,509 A | 1/1996 | Knowles | |
| 5,504,852 A | 4/1996 | Thompson-Rohrlich | |
| 5,559,945 A | 9/1996 | Beaudet et al. | |
| 5,561,604 A | 10/1996 | Buckley et al. | |
| 5,566,353 A | 10/1996 | Cho et al. | |
| 5,583,993 A | 12/1996 | Foster et al. | |
| 5,587,404 A | 12/1996 | Kroner et al. | |
| 5,616,876 A | 4/1997 | Cluts | |
| 5,633,839 A | 5/1997 | Alexander et al. | |
| 5,640,566 A | 6/1997 | Victor et al. | |
| 5,666,530 A | 9/1997 | Clark et al. | |
| 5,710,922 A | 1/1998 | Alley et al. | |
| 5,714,971 A * | 2/1998 | Shalit et al. ................... 715/804 |
| 5,721,949 A | 2/1998 | Smith et al. | |
| 5,726,909 A | 3/1998 | Krikorian | |
| 5,727,202 A | 3/1998 | Kucala | |
| 5,734,823 A | 3/1998 | Saigh et al. | |
| 5,739,451 A | 4/1998 | Winksy et al. | |
| 5,740,134 A | 4/1998 | Peterson | |
| 5,819,160 A | 10/1998 | Foladare et al. | |
| 5,835,721 A | 11/1998 | Donahue et al. | |
| 5,835,732 A | 11/1998 | Kikinis et al. | |

(Continued)

FOREIGN PATENT DOCUMENTS

EP 0 917 077 5/1999

(Continued)

OTHER PUBLICATIONS

De Herrera, Chris, "Microsoft ActiveSync 3:1," Version 1.02, Oct. 13, 2000.

(Continued)

*Primary Examiner* — Li Zhen
*Assistant Examiner* — Evral Bodden

(57) ABSTRACT

Improved techniques for automatic (or dynamic) updating (or maintaining) of file groups in a developer environment that stores and executes files are disclosed. The automatic update to file groups can occur when additional files are added to or removed from the developer environment. The automatic update to file groups can also occur when previously stored files are otherwise altered.

35 Claims, 17 Drawing Sheets

U.S. PATENT DOCUMENTS

| | | | |
|---|---|---|---|
| 5,845,282 A | 12/1998 | Alley et al. | |
| 5,864,868 A | 1/1999 | Contois | |
| 5,875,110 A | 2/1999 | Jacobs | |
| 5,897,642 A * | 4/1999 | Capossela et al. | 707/203 |
| 5,918,213 A | 6/1999 | Bernard et al. | |
| 5,918,303 A | 6/1999 | Yamaura et al. | |
| 5,923,757 A | 7/1999 | Hocker et al. | |
| 5,925,843 A | 7/1999 | Miller et al. | |
| 5,926,819 A * | 7/1999 | Doo et al. | 1/1 |
| 5,963,916 A | 10/1999 | Kaplan | |
| 5,969,283 A | 10/1999 | Looney et al. | |
| 5,983,069 A | 11/1999 | Cho et al. | |
| 5,995,098 A | 11/1999 | Okada et al. | |
| 6,000,000 A | 12/1999 | Hawkins et al. | |
| 6,006,274 A | 12/1999 | Hawkins et al. | |
| 6,038,199 A | 3/2000 | Pawlowski et al. | |
| 6,041,023 A | 3/2000 | Lakhansingh | |
| 6,052,797 A | 4/2000 | Ofek et al. | |
| 6,061,306 A | 5/2000 | Buchheim | |
| 6,098,072 A * | 8/2000 | Sluiman et al. | 1/1 |
| 6,125,369 A | 9/2000 | Wu et al. | |
| 6,172,948 B1 | 1/2001 | Keller et al. | |
| 6,208,044 B1 | 3/2001 | Viswanadham et al. | |
| 6,216,131 B1 | 4/2001 | Liu et al. | |
| 6,243,328 B1 | 6/2001 | Fenner et al. | |
| 6,243,725 B1 | 6/2001 | Hempleman et al. | |
| 6,247,135 B1 | 6/2001 | Feague | |
| 6,248,946 B1 | 6/2001 | Dwek | |
| 6,255,961 B1 | 7/2001 | Van Ryzin et al. | |
| 6,272,545 B1 | 8/2001 | Flanagin et al. | |
| 6,283,764 B2 | 9/2001 | Kajiyama et al. | |
| 6,295,541 B1 | 9/2001 | Bodnar et al. | |
| 6,332,175 B1 | 12/2001 | Birrell et al. | |
| 6,338,044 B1 | 1/2002 | Cook et al. | |
| 6,341,316 B1 | 1/2002 | Kloba et al. | |
| 6,356,971 B1 | 3/2002 | Katz et al. | |
| 6,380,947 B1 | 4/2002 | Stead | |
| 6,389,467 B1 | 5/2002 | Eyal | |
| 6,407,750 B1 | 6/2002 | Gioscia et al. | |
| 6,434,680 B2 | 8/2002 | Belknap et al. | |
| 6,446,080 B1 | 9/2002 | Van Ryzin et al. | |
| 6,452,609 B1 | 9/2002 | Katinsky et al. | |
| 6,453,281 B1 | 9/2002 | Walters et al. | |
| 6,490,432 B1 | 12/2002 | Wegener et al. | |
| 6,493,758 B1 | 12/2002 | McLain | |
| 6,523,124 B1 | 2/2003 | Lunsford et al. | |
| 6,529,804 B1 | 3/2003 | Draggon et al. | |
| 6,563,769 B1 | 5/2003 | Van Der Meulen | |
| 6,587,403 B1 | 7/2003 | Keller et al. | |
| 6,587,404 B1 | 7/2003 | Keller et al. | |
| 6,621,768 B1 | 9/2003 | Keller et al. | |
| 6,636,873 B1 | 10/2003 | Carini et al. | |
| 6,664,981 B2 | 12/2003 | Ashe et al. | |
| 6,665,803 B2 | 12/2003 | Lunsford et al. | |
| 6,718,348 B1 | 4/2004 | Novak et al. | |
| 6,721,489 B1 | 4/2004 | Benyamin et al. | |
| 6,731,312 B2 | 5/2004 | Robbin | |
| 6,760,721 B1 | 7/2004 | Chasen et al. | |
| 6,763,345 B1 | 7/2004 | Hempleman et al. | |
| 6,779,019 B1 | 8/2004 | Mousseau et al. | |
| 6,785,542 B1 | 8/2004 | Blight et al. | |
| 6,794,566 B2 | 9/2004 | Pachet | |
| 6,801,964 B1 | 10/2004 | Mahdavi | |
| 6,874,037 B1 | 3/2005 | Abram et al. | |
| 6,928,433 B2 | 8/2005 | Goodman et al. | |
| 6,933,433 B1 | 8/2005 | Porteus et al. | |
| 6,941,324 B2 | 9/2005 | Plastina et al. | |
| 6,978,127 B1 | 12/2005 | Bulthuis et al. | |
| 6,983,457 B2 * | 1/2006 | Mitsumori et al. | 717/145 |
| 6,987,221 B2 | 1/2006 | Platt | |
| 7,003,495 B1 | 2/2006 | Burger et al. | |
| 7,043,477 B2 | 5/2006 | Mercer et al. | |
| 7,055,165 B2 | 5/2006 | Connelly | |
| 7,111,009 B1 | 9/2006 | Gupta | |
| 7,117,516 B2 | 10/2006 | Khoo et al. | |
| 7,126,770 B1 | 10/2006 | Arai et al. | |
| 7,171,557 B2 * | 1/2007 | Kallahalla et al. | 713/165 |
| 7,209,633 B1 | 4/2007 | Novak et al. | |
| 7,228,298 B1 | 6/2007 | Raines | |
| 7,272,385 B2 | 9/2007 | Mirouze et al. | |
| 7,478,323 B2 | 1/2009 | Dowdy | |
| 7,502,626 B1 | 3/2009 | Lemilainen | |
| 7,797,446 B2 | 9/2010 | Heller et al. | |
| 2001/0004310 A1 | 6/2001 | Kono | |
| 2001/0011308 A1 | 8/2001 | Clark et al. | |
| 2001/0021053 A1 | 9/2001 | Colbourne et al. | |
| 2001/0041021 A1 | 11/2001 | Boyle et al. | |
| 2001/0044835 A1 | 11/2001 | Schober et al. | |
| 2001/0048642 A1 | 12/2001 | Berhan | |
| 2001/0052123 A1 | 12/2001 | Kawai | |
| 2002/0002413 A1 | 1/2002 | Tokue | |
| 2002/0010788 A1 | 1/2002 | Nathan et al. | |
| 2002/0013784 A1 | 1/2002 | Swanson | |
| 2002/0015161 A1 | 2/2002 | Haneda et al. | |
| 2002/0016968 A1 | 2/2002 | Nathan et al. | |
| 2002/0046315 A1 | 4/2002 | Miller et al. | |
| 2002/0055934 A1 | 5/2002 | Lipscomb et al. | |
| 2002/0073167 A1 | 6/2002 | Powell et al. | |
| 2002/0080180 A1 * | 6/2002 | Mander et al. | 345/769 |
| 2002/0116082 A1 | 8/2002 | Gudorf | |
| 2002/0118300 A1 | 8/2002 | Middleton et al. | |
| 2002/0133515 A1 | 9/2002 | Kagle et al. | |
| 2002/0138606 A1 | 9/2002 | Robison | |
| 2002/0152278 A1 | 10/2002 | Pontenzone et al. | |
| 2002/0161865 A1 | 10/2002 | Nguyen | |
| 2002/0174269 A1 | 11/2002 | Spurgat et al. | |
| 2002/0194195 A1 | 12/2002 | Fenton et al. | |
| 2002/0194309 A1 | 12/2002 | Carter et al. | |
| 2003/0013493 A1 | 1/2003 | Irimajiri et al. | |
| 2003/0014767 A1 | 1/2003 | Stumphauzer | |
| 2003/0030733 A1 | 2/2003 | Seaman et al. | |
| 2003/0037254 A1 | 2/2003 | Fischer et al. | |
| 2003/0046434 A1 | 3/2003 | Flanagin et al. | |
| 2003/0046671 A1 * | 3/2003 | Bowen | 717/141 |
| 2003/0050058 A1 | 3/2003 | Walsh et al. | |
| 2003/0055723 A1 | 3/2003 | English | |
| 2003/0074457 A1 | 4/2003 | Kluth | |
| 2003/0079038 A1 | 4/2003 | Robbin et al. | |
| 2003/0081784 A1 * | 5/2003 | Kallahalla et al. | 380/277 |
| 2003/0093340 A1 | 5/2003 | Krystek et al. | |
| 2003/0098893 A1 * | 5/2003 | Makinen | 345/853 |
| 2003/0112279 A1 | 6/2003 | Irimajiri | |
| 2003/0149628 A1 | 8/2003 | Abbosh et al. | |
| 2003/0167318 A1 | 9/2003 | Robbin et al. | |
| 2003/0182315 A1 | 9/2003 | Plastina et al. | |
| 2003/0191756 A1 | 10/2003 | Oh | |
| 2003/0200532 A1 * | 10/2003 | Gensel | 717/120 |
| 2003/0206203 A1 * | 11/2003 | Ly | 345/853 |
| 2003/0210821 A1 | 11/2003 | Yogeshwar et al. | |
| 2003/0221541 A1 | 12/2003 | Platt | |
| 2004/0001395 A1 | 1/2004 | Keller et al. | |
| 2004/0001396 A1 | 1/2004 | Keller et al. | |
| 2004/0017997 A1 | 1/2004 | Cowgill | |
| 2004/0027930 A1 | 2/2004 | Kudo | |
| 2004/0055446 A1 | 3/2004 | Robbin et al. | |
| 2004/0076086 A1 | 4/2004 | Keller | |
| 2004/0083480 A1 * | 4/2004 | Dodge | 719/310 |
| 2004/0093274 A1 | 5/2004 | Vanska et al. | |
| 2004/0103102 A1 * | 5/2004 | Nelson | 707/100 |
| 2004/0113915 A1 | 6/2004 | Ohtsuki et al. | |
| 2004/0123242 A1 * | 6/2004 | McKibben et al. | 715/513 |
| 2004/0123725 A1 | 7/2004 | Kim | |
| 2004/0128277 A1 * | 7/2004 | Mander et al. | 707/1 |
| 2004/0139180 A1 | 7/2004 | White et al. | |
| 2004/0148358 A1 | 7/2004 | Singh et al. | |
| 2004/0205028 A1 | 10/2004 | Verosub et al. | |
| 2004/0223245 A1 | 11/2004 | Morohashi | |
| 2004/0225762 A1 | 11/2004 | Poo | |
| 2004/0249863 A1 * | 12/2004 | Kawamura | 707/104.1 |
| 2004/0261064 A1 * | 12/2004 | Goldstein et al. | 717/140 |
| 2005/0055718 A1 | 3/2005 | Stone | |
| 2005/0060264 A1 | 3/2005 | Schrock et al. | |
| 2005/0080915 A1 | 4/2005 | Shoemaker | |
| 2005/0120063 A1 * | 6/2005 | Koestler | 707/204 |
| 2005/0149392 A1 | 7/2005 | Gold et al. | |
| 2005/0235015 A1 | 10/2005 | Abanami et al. | |
| 2005/0240494 A1 | 10/2005 | Cue et al. | |

| | | | |
|---|---|---|---|
| 2005/0240661 | A1 | 10/2005 | Heller et al. |
| 2005/0249080 | A1 | 11/2005 | Foote et al. |
| 2005/0262528 | A1 | 11/2005 | Herley et al. |
| 2005/0267803 | A1 | 12/2005 | Patel et al. |
| 2005/0278377 | A1 | 12/2005 | Mirrashidi et al. |
| 2006/0015378 | A1 | 1/2006 | Mirrishidi et al. |
| 2006/0036567 | A1* | 2/2006 | Tan .................................. 707/1 |
| 2006/0066627 | A1 | 3/2006 | Gerhard et al. |
| 2006/0089949 | A1 | 4/2006 | Robbin |
| 2006/0100978 | A1 | 5/2006 | Heller et al. |
| 2006/0156236 | A1 | 7/2006 | Heller et al. |
| 2006/0156239 | A1 | 7/2006 | Jobs |
| 2006/0163358 | A1 | 7/2006 | Biderman |
| 2006/0168340 | A1* | 7/2006 | Heller et al. .................. 709/242 |
| 2006/0247980 | A1 | 11/2006 | Mirrashidi et al. |
| 2008/0256378 | A1 | 10/2008 | Guillorit |
| 2009/0063496 | A1 | 3/2009 | Cunningham et al. |
| 2009/0063543 | A1 | 3/2009 | Martin et al. |
| 2010/0042654 | A1 | 2/2010 | Heller et al. |

FOREIGN PATENT DOCUMENTS

| | | |
|---|---|---|
| EP | 0 982 732 | 3/2000 |
| EP | 1 028 425 | 8/2000 |
| EP | 1 548 740 | 6/2005 |
| JP | 2000-339917 | 12/2000 |
| JP | 2002-76465 | 3/2001 |
| JP | 2001-93226 | 4/2001 |
| JP | 2001-117800 | 4/2001 |
| JP | 2001/291365 A | 10/2001 |
| JP | 2002/74909 A | 3/2002 |
| WO | WO 95/16950 | 6/1995 |
| WO | WO 01/33569 | 5/2001 |
| WO | WO 01/67753 A1 | 9/2001 |
| WO | WO 02/25610 | 3/2002 |
| WO | WO 02/25935 | 3/2002 |
| WO | WO 03/023786 | 3/2003 |
| WO | WO 2004-004338 | 1/2004 |
| WO | WO 2004/084413 | 9/2004 |
| WO | 2005073856 A2 | 8/2005 |

OTHER PUBLICATIONS

IEEE 1394—Wikipedia, 1995, http://www.wikipedia.org/wiki/Firewire.
Miniman, "Applian Software's Replay Radio and Player v1.02," Product review, pocketnow.com, http://www.pocketnow.com/reviews/replay/replay.htm, Jul. 31, 2001.
Personal Jukebox (PJB), "Systems Research Center and PAAD," Compaq Computer Corp., Oct. 13, 2000, http://research.compaq.com/SRC/pjb/.
Compaq, "Personal Jukebox," Jan. 24, 2001, http://research.compaq.com/SRC/pjb/.
Steinberg, "Sonicblue Rio Car," Product Review, Dec. 12, 2000, http://electronics.cnet.com/electronics/0-6342420-1304-4098389.html.
Andrew Birrell, "Personal Jukebox (PJB)," Oct. 13, 2000, http://birrell.org/andrew/talks/pjb-overview.ppt.
Travis Butler, "Portable MP3: The Nomad Jukebox," Jan. 8, 2001, http://db.tidbits.com/getbits.acgi?tbart=06261.
Travis Butler, "Archos Jukebox 6000 Challenges Nomad Jukebox," Aug. 13, 2001, http://db.tidbits.com/getbits.acgi?tbart=06521.
Adam C. Engst, "SoundJam Keeps on Jammin'," Jun. 19, 2000, http://db.tidbits.com/getbits.acgi?tbart=05988.
Musicmatch, "Musicmatch and Xing Technology Introduce Musicmatch Jukebox," May 18, 1998, http://www.musicmatch.com/info/company/press/releases/?year=1998&release=2.
"Nomad Jukebox," User Guide, Creative Technology Ltd., Version 1, Aug. 2000.
"Apple's iPod Available in Stores Tomorrow," Press Release, Apple Computer, Inc., Nov. 9, 2001.
"Digital Still Cameras—Downloading Images to a Computer," Mimi Chakarova et al., Multi-Media Reporting and Convergence, 2 pgs.
"Apple Introduces iTunes—World's Best and Easiest To Use Jukebox Software," Macworld Expo, San Francisco, Jan. 9, 2001.
iTunes, Playlist Related Help Screens, iTunes v1.0, Apple Computer, Inc., Jan. 2001.
"Apple Announces iTunes 2," Press Release, Apple Computer, Inc., Oct. 23, 2001.
Specification Sheet, iTunes 2, Apple Computer, Inc., Oct. 31, 2001.
iTunes 2, Playlist Related Help Screens, iTunes v2.0, Apple Computer, Inc., Oct. 23, 2001.
SoundJam MP Plus, Representative Screens, published by Casady & Greene, Inc., Salinas, CA, 2000.
"SoundJam MP Plus Manual, version 2.0"—MP3 Player and Encoder for Macintosh by Jeffrey Robbin, Bill Kincaid and Dave Heller, manual by Tom Negrino, published by Casady & Greene, Inc., 2000.
Replay Gain, "Replay Gain—A proposed Standard," Oct. 7, 2001, available from http://replaygain.hydrogenaudio.org/index.html and http://replaygain.hydrogenaudio.org/outline.html.
Office Action from European Patent Office for European Patent Application No. 03764426.7 dated Nov. 8, 2005+A90.
Glenn Fleishman, "Handheld iPod joins MP3 band a bit late, but is standout player," Nov. 6, 2001, http://seattletimes.nwsource.com/html/businesstechnology/134361811_ptmacc040.html.
"Hewlett Packard Jornada 525 Color Pocket PC," downloaded Jan. 25, 2002, http://www.pc4d.com/electronics/products/56/jornada_525_color_pocket_pc.shtml.
iTunes, Digital Music for your Mac, Apple Computer, Inc., downloaded Oct. 22, 2001, http://www.apple.com/itunes/.
"Rio Portable Music Player," Web Review, downloaded Jan. 25, 2002, http://www.webreviews.com/9901/rio.html.
Andy Lindauer, "What's in your Pocket?," Edgereview, downloaded Jan. 25, 2002, http://www.edgereview.com/print.cfm?Type=aag&ID=286.
U.S. Appl. No. 10/973,925, filed Oct. 25, 2004.
U.S. Appl. No. 11/097,591, filed Apr. 1, 2005.
U.S. Appl. No. 11/097,034, filed Apr. 1, 2005.
International Search Report dated Jul. 9, 2003, from International Application No. PCT/US03/21534.
U.S. Appl. No. 10/198,639, filed Jul. 16, 2002.
Breen, Christopher, "iMixing it Up: Sharing Your Sounds," Sep. 17, 2004, http://playlistmag.com/help/2004/09/imixhowto/index.php.
Kawamoto et al., "On 1$^{st}$ Birthday, iTunes Unwraps New Features," Apr. 28, 2004, http://news.com.com/On+1st+birthday,+iTunes+unwraps+new+features/2100-1027_3-5201598.html.
PBS Local Insertion Server Instruction Manual, Microvision, Inc., Jun. 19, 1996, pp. 1-71.
Wave Station Digital Audio Automation System, Instruction & Operations Manual Broadcast Software International, pp. 1-113, Feb. 4, 1997.
Nielsen et al., "Comparative Design Review: An Exercise in Parallel Design", INTERCHI '93, pgs., Apr. 24-29, 1993, 414-417.
Lowery Daryl, "Random-Access Digital Audio—Recording Systems", Jun. 1992, pp. 68-71.
Sadie Master System, Product Brochure, Studio audio Digital Equipment Inc., 2 pgs.
RCS Works-Cart Wall User's Guide and Reference Manual, pp. 1-83, Feb. 7, 1993.
"Digital Audio Just Got Easier!", CartWorks Digital Audio Systems, dbm Systems, Inc.
"CartWorks File Utilities User's Manual", dbm Systems, Inc., pp. 1-8.
"CartWorks MHD Music-on-Hard-Drive QuickSchedule User's Manual", dbm Systems, Inc., pp. 1-8, Feb. 8, 1998.
"CartWorks MHD Music-on-Hard-Drive User's Manual V6.8", dbm Systems, Inc., pp. 1-11.
"CartWorks On-Demand Editor User's Manual", dbm Systems, Inc., pp. 1-7.
"CartWorks Script Editor User's Manual v3.12", dbm Systems, Inc., pp. 1-26.
"CartWorks Spot Set Editor User's Manual", dbm Systems, Inc., pp. 1-11.
"The DADpro Digital Audio Delivery System Operation Manual Version 1.0", IBM Corp., pp. 1-424, Aug. 30, 1996.
"Virtual Recorder—Basic Operations", ASC Audio Video Corporation, pp. 1-94, Sep. 9, 1996.

"Broadcast Tools: SpotBase, Playlist & TapeBase", ASC Audio Video Corporation, pp. 1-2.
"VR 300 Advanced Broadcast Video Server", ASC Audio Video Corporation, pp. 1-9.
"VR300 Video Server User Manual, Version 1.0", ASC Audio Video Corporation, pp. 1-40, Mar. 20, 1998.
"Gravis WinDecks Version 1.12", screen shots, Gravis Computer Technology Ltd., pp. 1-10.
WinDecks, User Instructions, Gravis Computer Technology Ltd., pp. 1-14.
U.S. Appl. No. 11/138,004, filed May 25, 2005.
U.S. Appl. No. 11/114,914, filed Apr. 25, 2005.
U.S. Appl. No. 11/454,060, filed Jun. 14, 2006.
Iriver, "PMP140/120", Sep. 13, 2004, 1-2 pgs.
MG-25, Portable MPEG4 Player (MG-25), Jul. 29, 2004, 1-3 pgs.
Half-life—Wikipedia, the free encyclopedia, http;//enwikipedia.org/wiki/Halfe-life, Feb. 22, 2009.
Mabini. MemMaid Review. Pocket PC Dubai, Jul. 23, 2004[online], [retrieved on Mar. 26, 2008]. Retrieved from the Internew <URL: http://www.pocketpcdubai.com/DinarSoft/memmaid_review.html>.
Windows XP Service Pack 2, Figures 1-2 and "How to obtain the latest Windows XP service pack," Aug. 25, 2004.
Office Action from European Patent Office for 03764426.7 mailed Aug. 14, 2006.
Torrone, Phillip, How-To: Getting Podcasts on a Portable Media Center (and other Windows Media Devices, Oct. 2004.
Office Action for European Patent Office for 03764426.7 mailed Sep. 11, 2009.
Notification of Reason for Rejection for Japanese Patent Application 2004-521604, mailed Apr. 15, 2008 (with translation).
Notification for Reason for Rejection for Japanese Patent Application 2004-521604, mailed Jun. 16, 2009 (with translations).
Written Opinion for PCT/US03/21534 mailed Mar. 12, 2004.
International Preliminary Examination Report for PCT/US/21534 mailed Jun. 8, 2004.
Personal Jukebox (PJB), "System Research Center and PAAD", Compaq Computer Corp., Oct. 13, 2000, http;//research.compaq.com/SRC/pjb/.
Etchison, "Accelerated Discrete Adjustment of the Parameters of a Process", IBM Technical Disclosure Bulletin, vol. 15, No. 5, Oct. 1, 1972, 2 pgs.
Notification for Reason for Rejection for Japanese Patent Application 2004-521604, mailed Mar. 9, 2010 (with translations).
Office Action for U.S. Appl. No. 10/198,639, mailed Dec. 2, 2005.
Final Office Action for U.S. Appl. No. 10/198,639, mailed May 4, 2006.
Advisory Action U.S. Appl. No. 10/198,639, mailed Aug. 25, 2006.
Office Action for U.S. Appl. No. 10/198,639, mailed Jan. 3, 2007.
Final Office Action for U.S. Appl. No. 10/198,639, mailed Jun. 12, 2007.
Office Action for U.S. Appl. No. 10/198,639, mailed Oct. 3, 2007.
Notice of Allowance for U.S. Appl. No. 10/198,639, mailed Apr. 2, 2010.
Handbook for Palm™ m500 Series Handhelds, User Manual.
Sinitsyn, "A Synchronization Framework for Personal Mobile Servers," Proceedings of the Second IEEE Annual Conference on Pervasive Computing and Communications Workshops, Piscataway, NJ, Mar. 14, 2004, pp. 1-4.
Vetro et al., "Media Conversions to Support Mobile Users," IEEE Canadian Conference on Electrical and Computer Engineering, Piscataway, NJ, May 13, 2001, pp. 607-612.
Zheng et al., "MobiGATE: a mobile gateway proxy for the active deployment of transport entities," Proceedings of the 2004 International Conference on Parallel Processing, Piscataway, NJ, Aug. 15, 2004.
RCA Lyra User's Guide, RD2201/2202/2204, www.lyrazone.com, pp. 1-37.
Lyra, Personal Digital Player, RCA, Product Box.
Compaq Computer Corp., copyright 1991, Personal Jukebox User Manual, pp. 1-29.
"About MusicMatch Jukebox," MusicMatch Jukebox v4 Help, pp. 1-4.
RealJukebox Plus Manual, Real Networks, Inc., copyright 1999, pp. 1-83, RealJukebox, Real Networks, Inc., webpages downloaded Oct. 27, 2005 http://www.real.com/Jukebox/release_notes.html#.
TuneBase 100 User Guide, A CD Library Management System, Escient, Inc. copyright 1999.
TuneBase Pro Mk-II User's Guide, Escient, Inc.
Window's Media Player 6.4, Microsoft Corp., copyright 1999, software available at http://www.oldversion.com/program.php?n=wmp See also Windows Media Player 6.4 Software Official website at http://www.microsoft.com/windows/windowsmedia/player/version64/default.aspx.
Bridgman, "Windows XP Expert Zone Community Columist", Using Windows Mobile-based Portable Media Centers and Windows Media Player 10, Aug. 25, 2004, 1-11.
Summons to Attend Oral Proceedings for European Patent Application No. 03764426.7, mailed Jun. 9, 2010.
Office Action for Japanese Patent Application No. 2010-157096, dated Feb. 28, 2012.
Minutes of the Oral Proceedings for EP Patent Application No. 03764426.7, dated Jan. 26, 2011.
Office Action (Questioning) for Japanese Patent Application No. 2004-521604, dated May 17, 2011.
Office Action for U.S. Appl. No. 12/582,624, mailed Nov. 24, 2010.
Final Office Action for U.S. Appl. No. 12/582,624, mailed May 10, 2011.
Notice of Allowance for U.S. Appl. No. 12/582,624, mailed Oct. 5, 2011.

\* cited by examiner

METHOD AND SYSTEM FOR DYNAMICALLY POPULATING GROUPS IN A DEVELOPER ENVIRONMENT

RELATED APPLICATIONS

This application is related to application Ser. No. 10/198,639, entitled "Method and System for Updating Playlists," filed on Jul. 16, 2002, which is incorporated herein by reference for all purposes.

This application also claims priority from provisional application No. 60/513,958, entitled "Method and System for Dynamically Populating Groups in a Developer Environment," listing Naroff, et al. as inventors, filed on Oct. 23, 2003, which is incorporated herein by reference for all purposes.

BACKGROUND OF THE INVENTION

1. Field of the Invention

The present invention relates to dynamically populating groups of files and, more particularly, to dynamically populating groups of files in a developer environment.

2. Description of the Related Art

Typically, application developers working on a particular project work concurrently on a large number of files, and therefore must also store and keep track of a large number of files. Depending upon the operating system of the application developer environment, application developers have the capability of creating either folders or directories to store source code files that are being generated or tested. Hence, in order to organize the files for a particular project, application developers typically manually create their own directories or folders in order to keep track of each of the files.

Conventionally, software application files have been manually stored in folders by the application developer using an operation such as a drag-and-drop operation. For instance, the application developer may group files according to project. As a result, each of the files may be manually stored in the appropriate folder.

While folders are generally functionally sufficient to enable files to be sorted and grouped, folders are typically grouped hierarchically in order to further sort files in a logical manner. Specifically, in order to sub-divide various groups to generate "sub-groups," it is often necessary to group the folders hierarchically. Although functionally sufficient, such hierarchical grouping is often complex. In fact, this complex grouping is often counter-intuitive. As a result, a developer who did not generate the hierarchical group of folders would have a difficult time navigating such a system. As a result, finding a desired file is often a difficult and time-consuming process. It follows that testing software applications grouped in such a manner would be a tedious and time-consuming process. In addition, as testing time increases, the costs of testing similarly increase.

Even a developer who was the originator of a file grouping hierarchy may not be able to recall a complex categorization scheme. In addition, it is important to note that during the development process, source code files are typically modified as testing is performed. As a result of these changes, the application developer may wish to re-categorize a particular file. However, file categorization is typically a manual process, as described above. Unfortunately, even if categorization of files has been performed upon creation of the files, this cannot reflect the changes that are continually made to the files. As a result, the developer must continually re-categorize the files, as appropriate. This requires diligence on the part of the application developer, as well as a well thought out folder hierarchy.

Thus, there is a need for improved techniques for categorizing and storing software application files in a software application environment.

SUMMARY OF THE INVENTION

Broadly speaking, the invention relates to automatic (or dynamic) generation or updating (or maintaining) of file groups in a file management system. The automatic update to file groups can occur when additional files are added to or removed from the file management system. The automatic update to file groups can also occur when the content of previously stored files is otherwise altered.

The invention can be implemented in numerous ways including as a method, system, device, apparatus, and computer readable medium. Several embodiments of the invention are discussed below.

As a computer-implemented method for automatically updating a file group, one embodiment of the invention includes at least the acts of: determining whether a file (e.g., content of the file) has been altered; and regenerating one or more file groups or associating the file with one or more file groups when it is determined that the file has been altered.

As a computer-implemented method for updating a file group, one embodiment of the invention includes at least the acts of: obtaining or receiving one or more file group rules to be used to create the file group; producing a file group from a plurality of available file items and the file group rules; subsequently determining whether the file group should be reproduced due to changes with respect to the available file items; and rebuilding the file group from the plurality of available file items and the file group rules when it is determined that the file group should be rebuilt.

As a computer-implemented method for generating a plurality of file groups, one embodiment of the invention includes at least the acts of: obtaining one or more file group rules to be used to create one of the plurality of file groups; producing the one of the plurality of file groups from a plurality of available files and the one or more file group rules; and repeating the obtaining and producing steps for the remaining ones of the plurality of file groups.

The embodiments of the invention may be implemented software, hardware, or a combination of hardware and software. The invention can also be embodied as computer readable code on a computer readable medium. In addition, data structures disclosed are also part of the invention.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention relates to automatic (or dynamic) generation or updating (or maintaining) of file groups (i.e., smart groups) in a software development system that enables files to be stored, compiled, and executed by a software developer. The automatic update to file groups can occur when a file is added to or removed from the software development system. The automatic update to file groups can also occur when previously stored files are otherwise altered.

In accordance with one embodiment, a file group is implemented as a folder or a directory. Thus, through the use of the present invention, a folder or directory may be automatically generated or updated. In this manner, files may be automatically categorized and stored in the appropriate folder or directory as the files are created or altered.

Embodiments of the invention are discussed below with reference to FIGS. 1A-10. However, those skilled in the art will readily appreciate that the detailed description given herein with respect to these figures is for explanatory purposes as the invention extends beyond these limited embodiments.

Figure 1A:
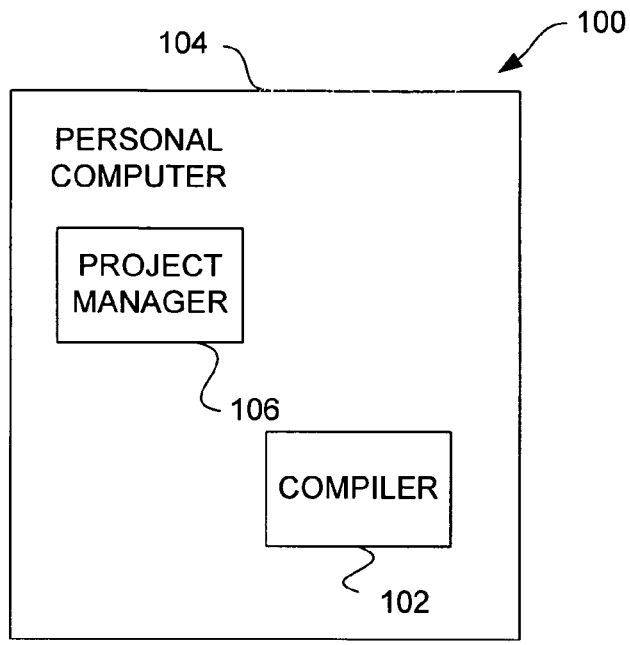
FIG. 1A is a block diagram of a file management system according to one embodiment of the invention.

FIG. 1A is a block diagram of a file management system 100 according to one embodiment of the invention. The file management system 100 includes a personal computer (host computer) 104 including a compiler 102. The compiler 102 may be any compiler used to compile source code written any language, such as an object-oriented language. The personal computer 104 also includes a project manager 106. The project manager 106 enables a user of the personal computer 104 to directly manage files such as source code files, tools used to compile or debug source code files, files containing errors and/or warnings that are generated after compilation or execution, and images such as TIFF, JPEG, or RAW images stored on the personal computer 104. The project manager 106 may also manage files generated by the compiler 102.

The project manager 106 facilitates browsing, adding, deleting, organizing, and other operations with respect to files stored on the personal computer 104. More particularly, the project manager 106 assists a user in organizing files into one or more file groups. A file group is a list of files or file items that can be accessed (e.g., compiled, executed, or viewed). Depending on the type of file involved, the manner in which a file is compiled or executed can vary. According to various embodiments of the invention, a file group is able to be automatically updated subsequent to its initial creation. Those file groups that are automatically updated can be referred to as dynamic file groups. In other words, a dynamic file group is a file group that is to be automatically updated as appropriate when a file (e.g., content of the file) is altered, added, or deleted. Specifically, a file may be altered such that it is no longer in the file group or such that it is a new member of the file group. Moreover, the alteration of a file will determine the content of the information that is presented for that file when its associated file group(s) is accessed and displayed. A non-dynamic file group is a file group that is fixed on creation (i.e., not updated) regardless of changes to an associated file (e.g., a file that is present in the file group when the file group is created). In either case, manual user actions can typically be used to alter the file groups.

According to one embodiment, a user can form file groups manually by a drag-and-drop operation or automatically from one or more user-provided rules. In such an embodiment, the rules-based file groups can be automatically updated (i.e., dynamic file groups), whereas other file groups that are not rules-based cannot be automatically updated (i.e., non-dynamic file groups). Additionally, the project manager 106 can also assist a user in adding and removing files or file groups.

In other embodiments, the rules are pre-defined rather than user-provided. For example, a set of one or more file groups may be pre-defined for use by application developers. Such file groups may include, for example, an "Error and Warnings" file group and a "Find Result" file group. Selection of the "Error and Warnings" file group may, for example, list errors or warnings resulting from compilation or execution of one or more files. Specifically, a single entry that is displayed may list an error or warning resulting from compilation or execution of a file, the file name of the file from which the error or warning was generated, and the line number of the relevant line of the file. Selection of the "Find Result" file group may, for example, enable a user to search for files containing a particular search term or phrase, and will therefore include information such as the file name of the file, text from the relevant line of the file, and line number of the relevant line of the file. For each file group, the user (e.g., application developer) may select the information that is to be displayed or hidden for the files present in the file group. In other words, the information presented to the user when that file group is selected for display to the user may vary depending upon the user's preferences.

The project management system 100 need not include the compiler 102. Nevertheless, in one embodiment, the files may include source code that is to be compiled by the compiler 102. Thus, as a result of compiling and executing the source code, additional files such as executable files and error files may be generated. As these new files are generated, the user-provided rules can automatically classify these files in the appropriate set of one or more file groups. For example, an "Error and Warnings" file group may include a file that stores errors and/or warnings that are generated as a result of compilation or execution in the form of the error or warning and relevant line number in the file that caused the error or warning.

Similarly, the simple modification of a file (e.g., source code or text) can automatically classify a file in the appropriate set of one or more file groups. For example, a developer may search for files including a particular word or phrase (e.g., variable or relevant text), such as "TIME=." Such a search tool is particularly useful during testing and debugging when a developer has a general idea of where the problem lies. As one example, the developer may suspect that a particular variable (e.g., TIME) was not correctly initialized at the beginning of the program or procedure within the program. By using the search tool, a number of hits will result. These files can then be automatically categorized in a file group such as a "Find Result" file group. In this example, the generation or re-generation of the "Find Result" file group is initiated by a user selection (e.g., viewing information in the "Find Result" group). However, it is important to note that the automatic application of the rules for purposes of generation or regeneration of a particular file group need not be initiated by a user action such as a request to display information associated with a particular file group. In other words, the generation or regeneration of the appropriate file group(s) may be automatically performed upon alteration of a particular file. The file information for a particular file group may then be displayed upon selection by the user/developer.

In accordance with one embodiment, generation and/or regeneration of one or more file groups results in the storing of the created and/or modified file groups and associated file group information. In other words, the links between the file groups and associated files or file items are stored or updated. In other embodiments, the generation and/or regeneration of a file group is temporary and merely displayed to the user upon selection of the file group.

Figure 1B:
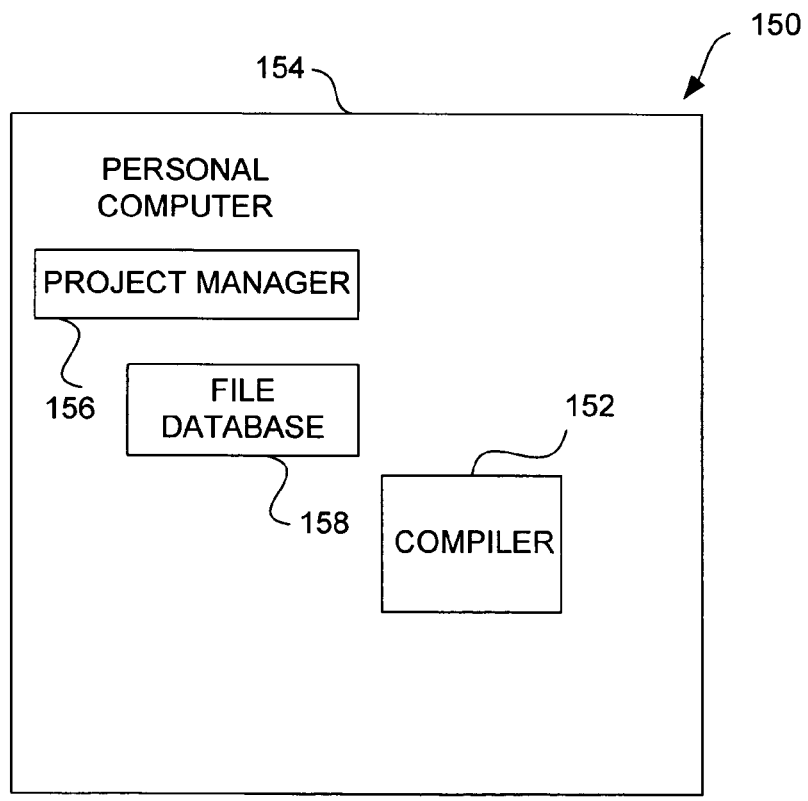
FIG. 1B is a block diagram of a file storage system according to one embodiment of the invention.

FIG. 1B is a block diagram of a file storage system 150 according to one embodiment of the invention. The file storage system 150 can, for example, represent one embodiment of the more general file management system 100 illustrated in FIG. 1A. The file storage system 150 includes a compiler 152 and a personal computer 154. The personal computer 154 also includes a project manager 156. The personal computer 154 further includes a file database 158. The compiler 152 may also have an associated file database (not shown) for storing files that are to be compiled or files that have been compiled. The personal computer 154 will also generally include or have associated therewith a data storage device (e.g., disk drive) for storing files and/or file group information, a cache memory for storing files and/or file group information in-use, a screen display for displaying information to a user, and a processor (e.g., microprocessor) for controlling operation of the compiler 152.

A synchronization operation between the files stored on the personal computer 154 and the files generated by the compiler 152 can be achieved in a sophisticated manner through comparison of files stored in the respective file databases, or as files are generated by the compiler. When the comparison of the files from the respective databases indicates that a particular file has been generated by the compiler 152 but is not resident in the database 158 of the personal computer 154, then the particular file can be removed (deleted) from the file database associated with the compiler as well as stored in the file database 158 of the personal computer 154. In addition, one or more links between the file(s) and the corresponding file group(s) may be generated. Hence, by providing the compiler 152 with a corresponding database, more sophisticated synchronization and management of files within an application development environment is enabled. Similar operations may be performed as executable files are executed.

A user interface can be presented on the screen display of the personal computer 154. The user interface can, for example, allow the user of the compiler 152 to browse, sort, search, view, etc. errors such as those generated by the compiler 152. The user interface can also allow the user of the personal computer or compiler 152 to add (e.g., create or download) or delete (remove) files such as those generated by the compiler 152. The project manager 156 also has a user interface that allows a user to browse, sort, search, compile, execute, display, etc. the files and/or file groups resident on the personal computer 154.

Figure 2:
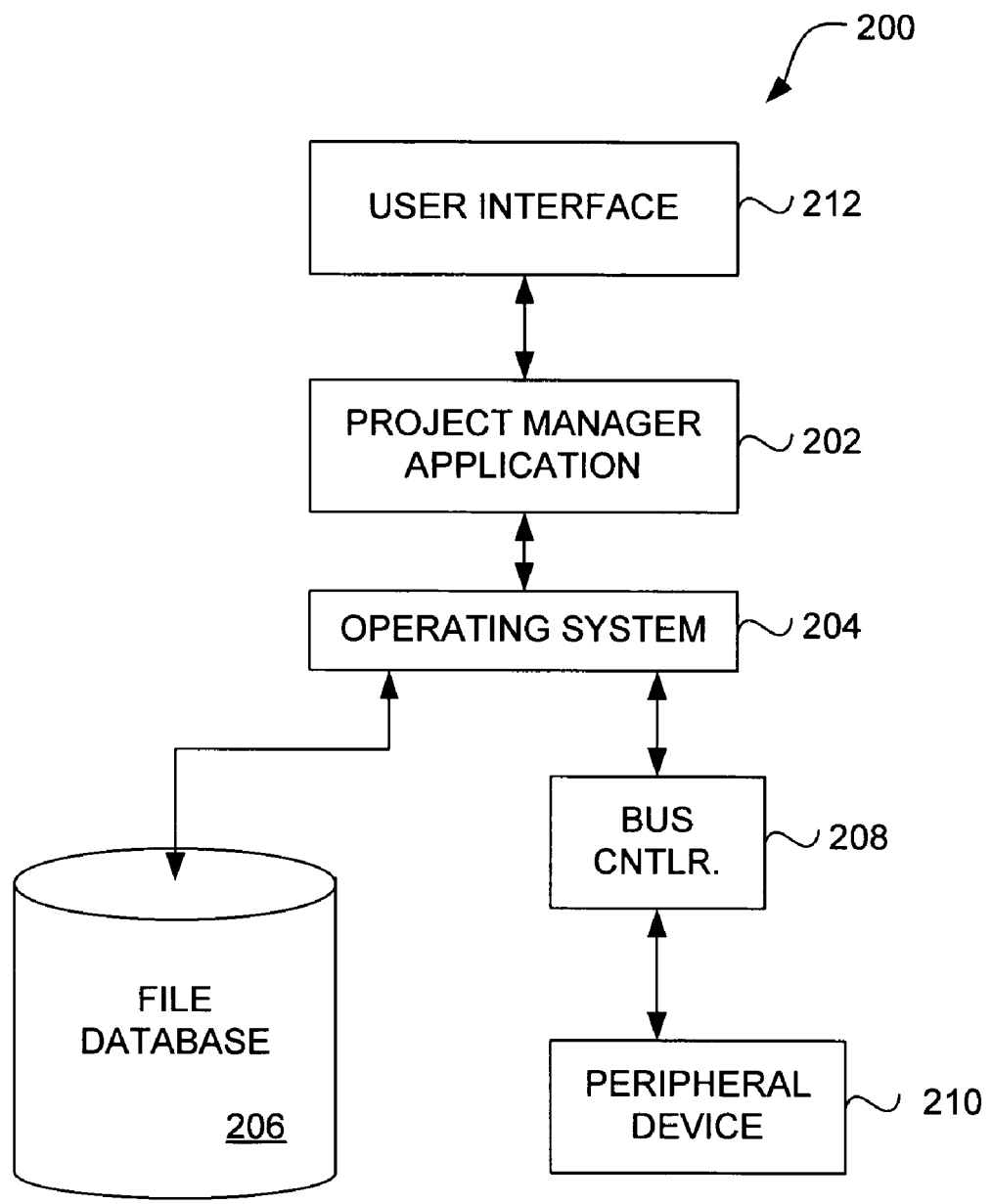
FIG. 2 is a block diagram of program architecture according to one embodiment of the invention.

FIG. 2 is a block diagram of program architecture 200 according to one embodiment of the invention. The program architecture 200 is used to update file groups (i.e., dynamic file groups) in accordance with one embodiment of the invention. The program architecture 200 is centered about a project manager application 202. The project manager application 202 permits users to store and execute files, as well as to create and utilize file groups composed of one or more particular files. The project manager application 202 couples to an operating system 204. The operating system 204 in turn couples to a file database 206 that stores files to be accessed by the project manager application 202. The file database 206 also stores file groups that have been created by the project manager application 202. The project manager application 202 also operates to update one or more file groups that are stored within the file database 206. Specifically, a file may be added to one or more file groups, as well as removed from one or more file groups. The program architecture 200 also includes a bus controller 208 that couples a peripheral device 210 to the operating system 204. Here, the peripheral device 210 can be utilized to provide another file source for the project manager application 202.

Figure 3A:
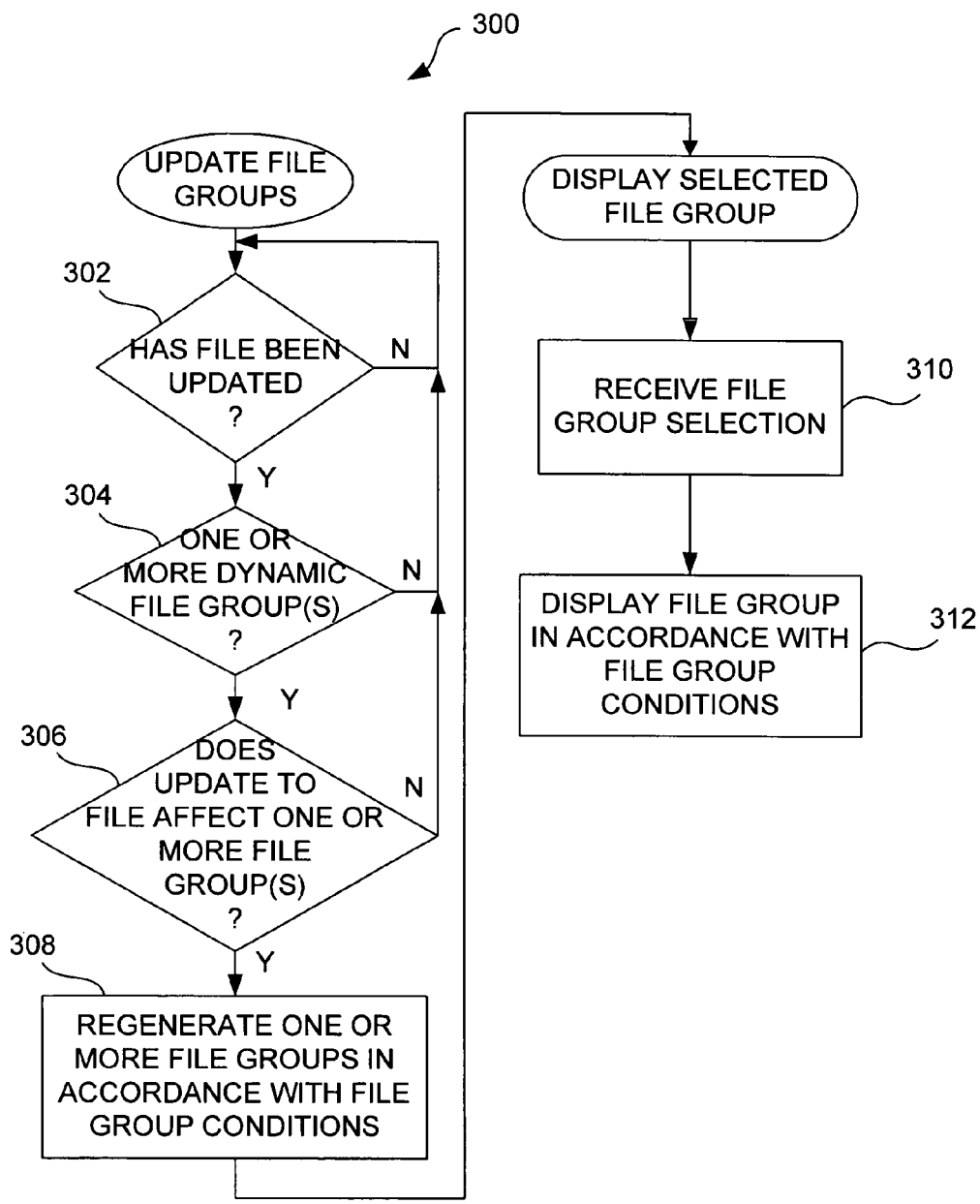
FIG. 3A is a flow diagram of dynamically populating a file group according to one embodiment of the invention.

FIG. 3A is a flow diagram of update file group processing 300 according to one embodiment of the invention. The update file group processing 300 can be performed on a system offering file group support such as that described above. For example, the project management system can be a computing device, such as a personal computer.

The update file group processing 300 begins with a decision 302 that determines whether a file has been updated (e.g., when the file has been stored). Examples of files include, but are not limited to, image files, text files, source code files, and executable files. The file may be accessed via a remote server through the Internet, or a local disk drive. When the decision 302 determines that a file has not been updated, then no modifications, additions or deletions to the file group(s) are made. Thus, the update file group processing 300 returns to repeat the decision 302 (e.g., when a file is saved).

On the other hand, once the decision 302 determines that a file has been updated (e.g., modified), then a decision 304 determines whether one or more dynamic file groups have been established. One or more of these dynamic file groups may already be associated with the file. Alternatively, the file may not be associated with any of the dynamic file groups. A dynamic file group is a file group that is to be updated as appropriate when a file (e.g., file contents) is altered. When the decision 304 determines that no dynamic file groups have been created, then the update file group processing 300 returns to repeat the decision 302 and subsequent blocks. In other words, when there is no dynamic file group, then the balance of the update file group processing 300 need not be performed.

Alternatively, when the decision 304 determines that there is a dynamic file group that has been established, then a decision 306 determines whether the update to the file affects one or more dynamic file groups. When the decision 306 determines that the update to the file does not affect one or more dynamic file groups, then the update file group processing 300 returns to repeat the decision 302 and subsequent blocks. Here, even when one or more file groups are dynamic, if the alterations to the file do not impact one or more of the dynamic file groups, the balance of the update file group processing 300 need not be performed.

When the decision 306 determines that the update to the file does affect one or more of the dynamic file groups (e.g., a file group selected by a user), then the one or more dynamic file groups are regenerated at 308 in accordance with corresponding file group conditions. The file group conditions associated with a particular file group specify one or more rules or criteria utilized in determining the items (e.g., column items) of the file that are to be included in the dynamic file group. The file group conditions are thus associated with a particular dynamic file group. After the dynamic file group(s) has been regenerated 308, the update file group processing 300 is complete and ends with the dynamic file group having been regenerated.

The decision 306, if implemented, is used to improve performance efficiency. Namely, the decision 306 allows the regeneration 308 of the dynamic file group(s) to be avoided when the updates to the file would not cause the dynamic file group(s) to change if it were regenerated. Hence, if desired, the decision 306 can be approximated or even eliminated in other embodiments. Additionally, if the dynamic file group were being displayed on a display screen when the regeneration 308 was performed, then the displayed dynamic file group could be re-drawn so as to reflect the regenerated version of the dynamic file group. If a file group has not yet been selected by a user, a file group may then be selected at 310 and displayed at 312.

Figure 3B:
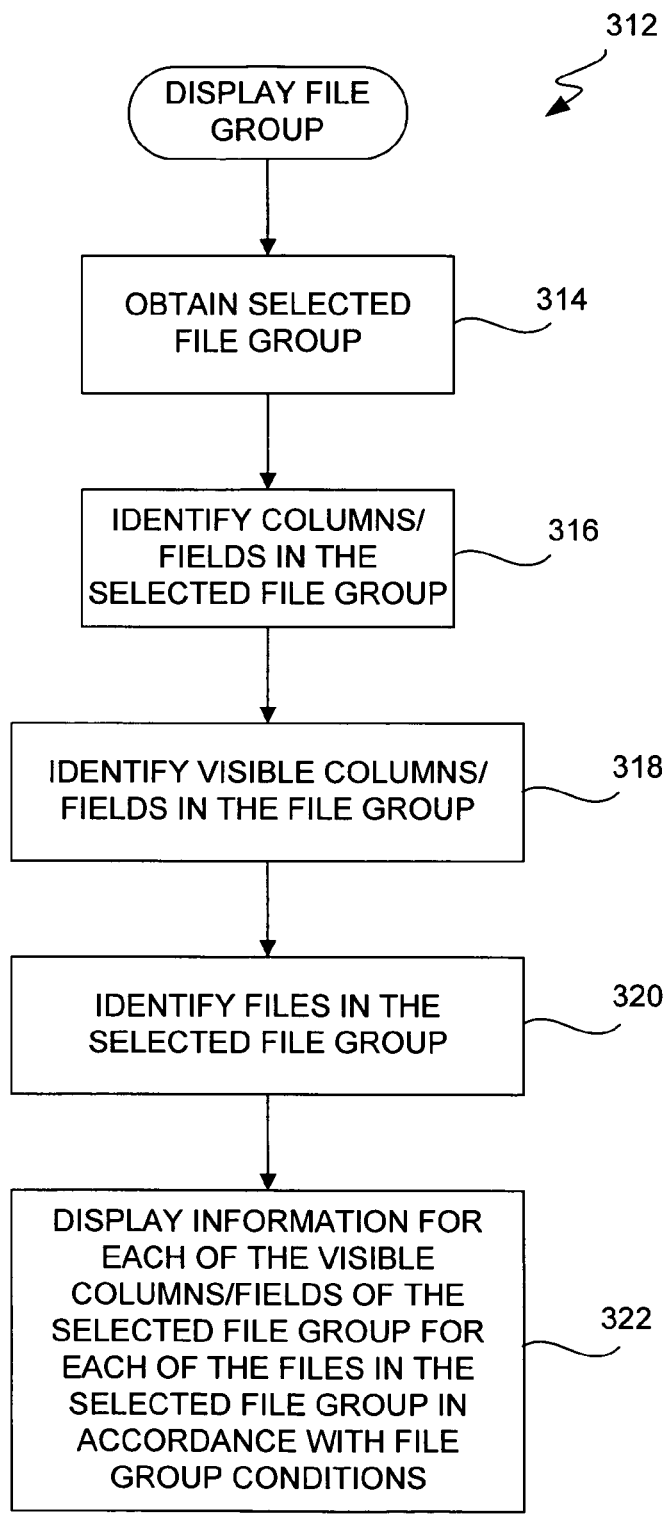
FIG. 3B is a diagram illustrating a method of displaying a file group according to one embodiment of the invention.

FIG. 3B is a diagram illustrating a method of displaying a file group as described above with reference to 312 of FIG. 3A. Specifically, the file group (e.g., a user selected file group) is identified or obtained at 314. Items (e.g., fields) in the selected file group are then identified at 316. As described above, a user may select one or more of these items or fields to be displayed with respect to the selected file group. In other words, the remaining items in the selected file group may be hidden. For instance, the user may only be interested in line numbers and error messages for files within an ERRORS AND WARNINGS file group. Thus, the visible items in the file group are then identified at 318. Each of the files in the selected file group are identified at 320 and information for each of the visible items of the selected file group are displayed for each of the files in the selected file group at 322 in accordance with the conditions associated with the selected file group. For instance, the conditions may specify filter criteria (e.g., visible or hidden columns) or sort criteria.

According to one embodiment, each of the items in the selected file group represents a column of information to be displayed. Each file in the selected file group represents one or more rows of information to be displayed. In order to clearly represent the information, a visible item in the selected file group may be presented in the form of a "column header" with the information for each file being presented as one or more rows with corresponding column items beneath the column headers of the selected file group.

Figure 3C:
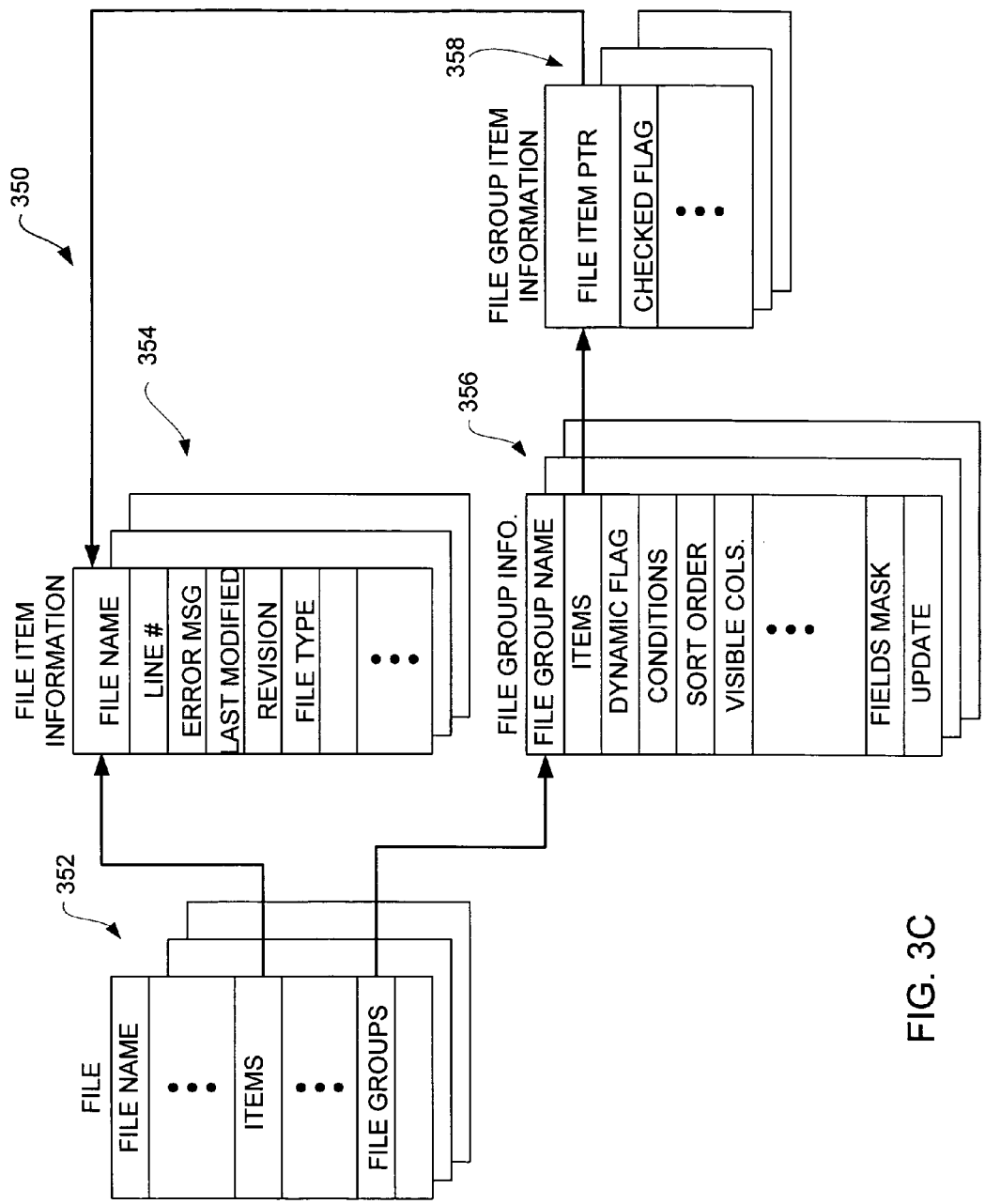
FIG. 3C is a diagram of a file database arrangement in accordance with one embodiment of the invention.

FIG. 3C is a diagram of a file database arrangement 350 in accordance with one embodiment of the invention. The file database arrangement 350 is, for example, suitable for use with the file database 206 illustrated in FIG. 2.

The file database arrangement 350 stores file data 352 for each file. The file information for a particular file can include various descriptive data such as file name, file items and file groups. The file items of the file 352 point to file item (e.g., column item) information 354. Specifically, one or more file items may be stored for each file. For example, when a file is compiled, one or more error messages may be generated. The file item information 354 contains various fields that provide descriptive information about particular file items. For example, for a particular item, the item information 354 can include a file name, line number, error message, date that the file was last modified, file version, file type, etc. The file groups associated with the file 352 can point to file group information associated with each of the file groups that are associated with the file 352. More particularly, the file groups that are identified within the file data 352 can point to file group information 356 pertaining to particular file groups. The file group information 356 includes various descriptive information for each file group. As an example, the file group information 356 can include file group name, items (e.g., column items), dynamic flag, conditions, sort order, visible columns, etc. The dynamic flag indicates whether or not the associated file group is to be dynamic.

It is important to note that the file group information (e.g., file group column items) will vary depending upon the file group. Moreover, different file groups such as "Errors and Warnings" may be predefined as well as user-defined. In addition, pre-defined file groups may be customized by selecting those columns that are to be visible (or hidden).

Still further, the file group information 356 can include a fields mask used to designate those fields that are present in the file group and an update flag to indicate whether the file group has been updated. The items within the file group information 356 point to file group item information 358 for particular items within a file group. The file group item information 358 includes at least a file item pointer to a particular file in the file information 354. Hence, the file item pointer within the file group item information 358 provides the pointer to the file item information 354 such that the file item (e.g., row) that is to be associated with a particular item in a file group is able to be identified and retrieved. The file group item information 358 can also include one or more file group-specific fields to provide specific information to be associated with particular items within a file group. As an example, the file group item information 358 shown in FIG. 3 includes a checked flag that is used in one embodiment of the invention to allow a user to check or uncheck particular items within a file group such that they are enabled or disabled from being displayed when the file item content of the file group is played.

Regeneration of a file group as described above with reference to 308 of FIG. 3A may be performed in a variety of ways. Since the modification of a file may affect the manner in which the file compiles or executes, this may affect one or more files. Thus, a modification to a file may affect one or more file groups as well as the number and content of row items within the file groups. For instance, modifying a file may generate fewer or greater errors during compilation of the file or execution of the file. Similarly, modifying a file may result in fixing a compilation or runtime error. As a result, this will affect whether the file will belong to an "Errors and Warnings" file group, as well as the number and content of the warnings and errors generated for a file that belongs to the "Errors and Warnings" file group. A set of column items will be generated for each warning or error, which may represent one row for purposes of displaying such a file group. For each row, the appropriate information such as file name, line number, and warning or error may be displayed. For this type of a file group, it is desirable to regenerate the entire "Errors and Warnings" file group, since a single modification may affect other entries previously present in the "Errors and Warnings" file group. This is particularly important when different procedures are being tested that will affect the execution of other procedures.

As another example, the modification of a file to include the variable "TIME" will result in a number of hits when a user selects a FIND RESULT file group and enters the search term "time." For each hit, the appropriate information such as file name, line number, and line text may be displayed. For this type of a file group, it is possible to simply add a set of column items (or row) in the appropriate file group, thereby adding the file to that file group.

An alteration of a file may include modifying a file, adding information to a file, or deleting information from a file. When a file is altered, this will therefore affect the file items that are linked to that file, as described above with reference to 354 of FIG. 3C. In addition, altering one file may alter other files such as compiled code and executable files. Thus, the file items and associated file item information are modified accordingly for each such file when the altered file is saved or stored. In other words, a file item may be added, deleted, or modified. Once the appropriate files and associated file item information has been altered, the appropriate file group(s) may be regenerated. It is also important to note that a file may also be added or deleted, which can affect the files and associated file items that are linked to a particular file group. An appropriate flag may be set to indicate whether a file has been modified, added or deleted, thereby indicating whether file group regeneration is necessary.

Figure 4:
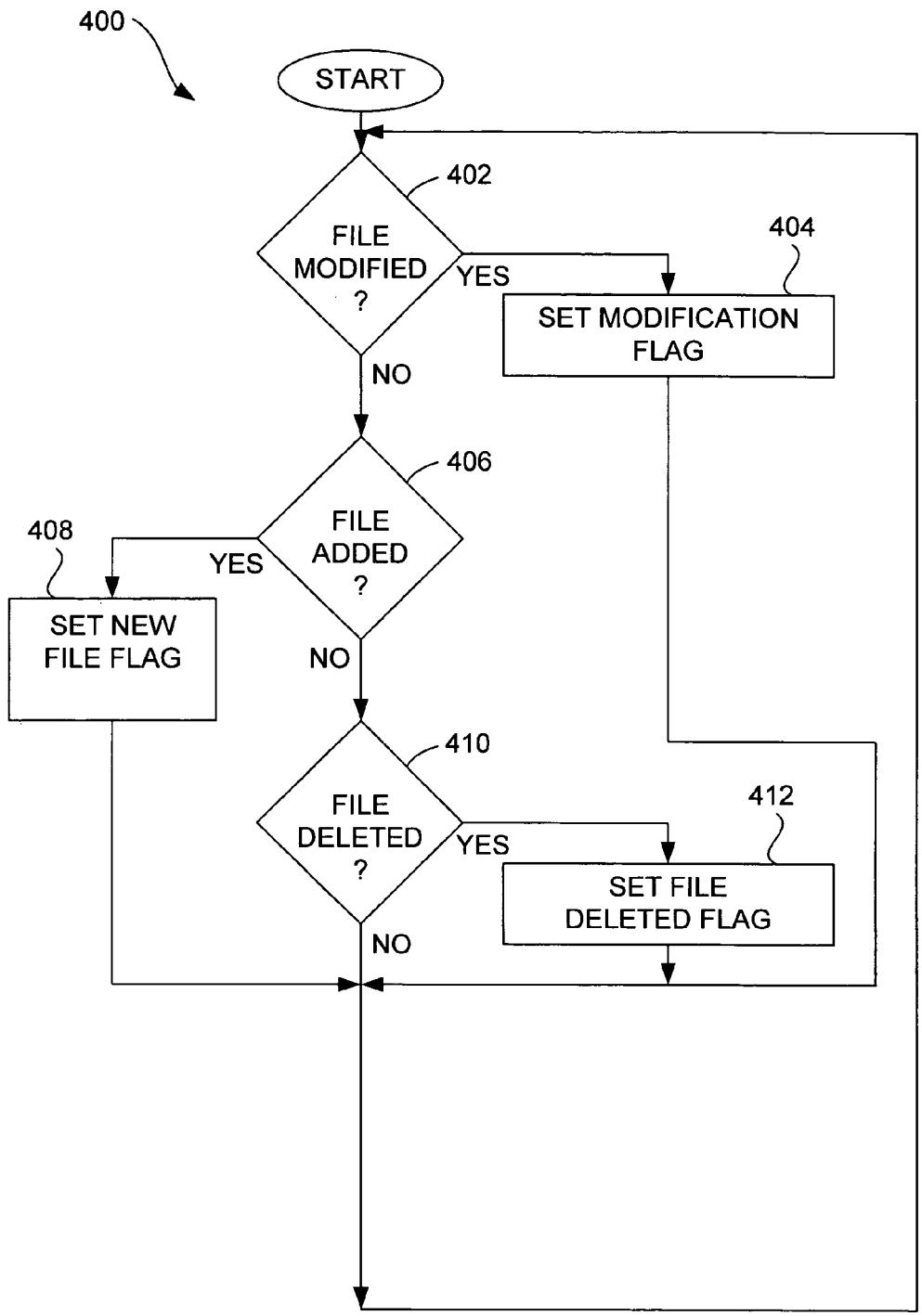
FIG. 4 is a flow diagram of file, modification 400 according to one embodiment of the invention.
Figure 5A:
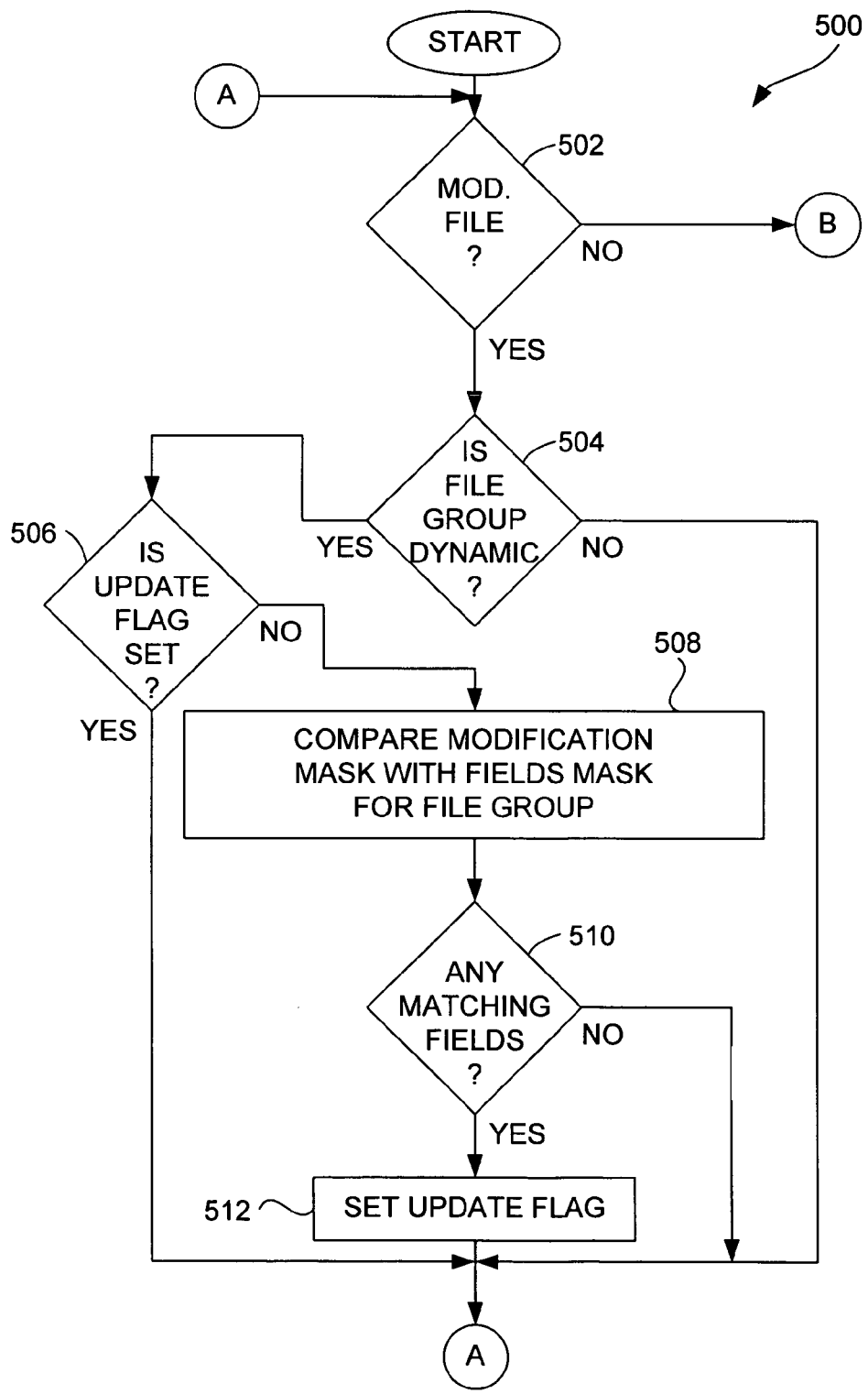
FIGS. 5A-5D are flow diagrams of determining whether a file group needs to be regenerated according to one embodiment of the invention.
Figure 5B:
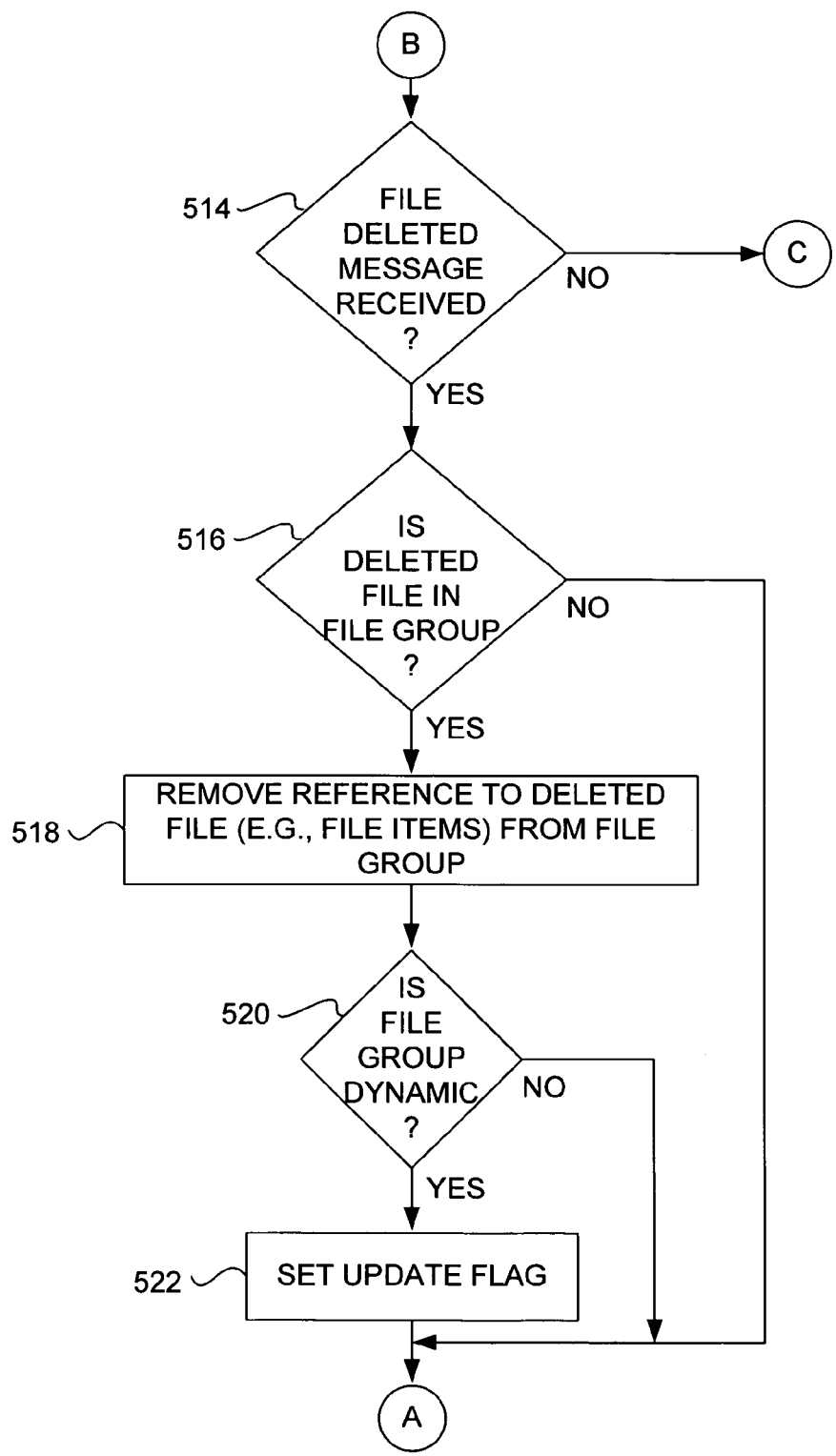
Figure 5C:
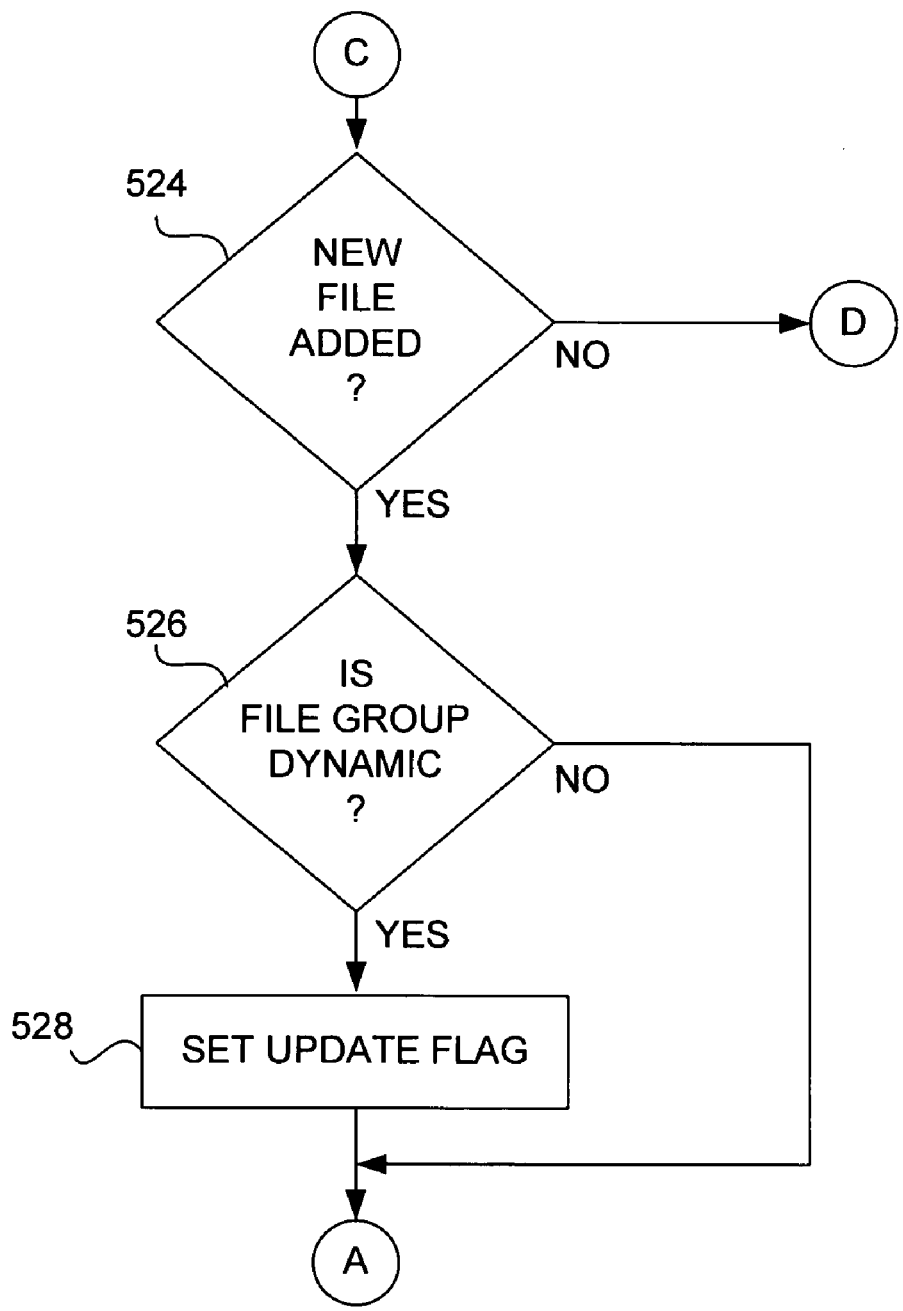
Figure 5D:
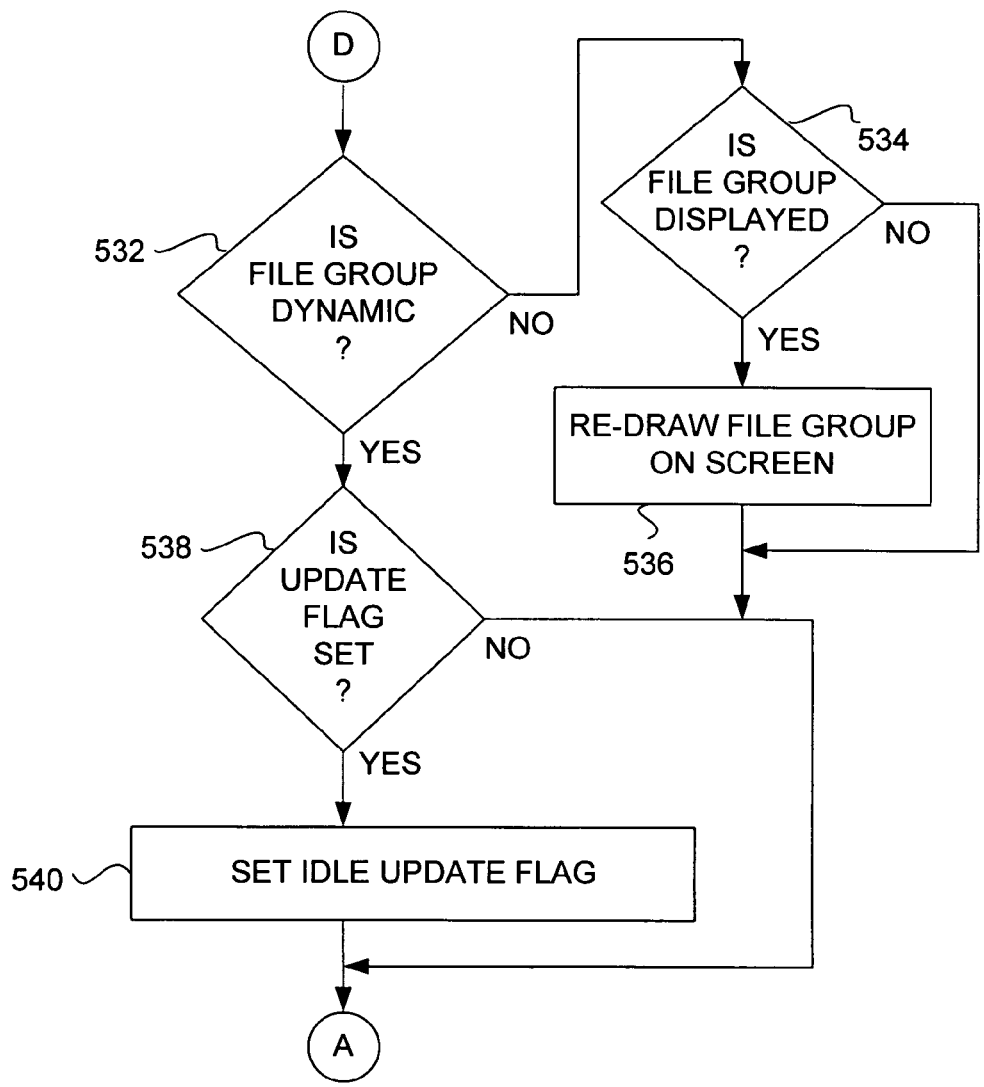

FIG. 4 is a flow diagram of file modification 400 according to one embodiment of the invention. The file modification 400 is, for example, performed by saving a file, compiling a file, or executing a file.

The file modification 400 begins with a decision 402. The decision 402 determines whether a file has been modified. When the decision 402 determines that a file has been modified, then a modification flag is set at 404. On the other hand, when the decision 402 determines that a file has not been modified, then a decision 406 determines whether a file has been added. When the decision 406 determines that a file has been added, then a new file flag is set 408. Alternatively, when the decision 406 determines that a file has not been added, then a decision 410 determines whether a file has been deleted. When the decision 410 determines that a file has been deleted, then a file deleted flag is set 412. Following the operations 404, 408, 410 (when a file is not being deleted), and 412 (when file is being deleted), the process may be performed for additional files. Specifically, when a set of changes are being made (e.g., set of files being modified, added or deleted) the changes can be processed as a set for more efficient processing.

In association with a particular flag (e.g., modified, deleted, or added flag), a pointer or reference to the appropriate file may be made. In this manner, the relevant file items may be identified. In addition, a modification mask may be used to indicate one or more modified fields of the file. In this manner, updating a particular file group or file groups may be simplified.

FIGS. 5A-5D are flow diagrams of determining whether a file group needs to be regenerated according to one embodiment of the invention. The processing 500 begins with a decision 502 that determines whether a file has been altered. In addition, as described above, an update flag may be associated with a particular file group to indicate whether the file group needs to be updated. When the decision 502 determines that a file has been altered (e.g., whether a file altered flag has been set), then a decision 504 determines whether the file group being processed is dynamic. When the decision 504 determines that the file group is dynamic, then a decision 506 determines whether an update flag is set. When the decision 506 determines that an update flag is not set, then a modification mask indicating one or more affected fields (e.g., file column items) is compared 508 with a fields mask for the file group. The fields mask, for example, can be provided within the file group information for the file group. The modification mask can be provided or obtained when the file has been saved, compiled, or executed. The comparison indicates whether any one or more fields of the file being modified are fields that are utilized by the file group.

A decision 510 then determines whether there are any matching fields between the modification mask and the fields mask. When the decision 510 determines that there are matching fields, then an update flag is set 512. The update flag is a flag that indicates that the dynamic file group is affected by the modification associated with the modification mask, and thus the dynamic file group should be updated. Alternatively, when the decision 510 determines that there are no matching fields, then the dynamic file group need not be updated and thus the operation 512 is bypassed. Still further, when the decision 504 determines that the file group is not dynamic or when the decision 506 determines that the update flag is already set, then the processing 500 returns to repeat the decision 502 and subsequent operations. Following the operation 512, the regeneration processing 308 also returns to repeat the decision 502 and subsequent operations.

On the other hand, when the decision 502 determines that a modification mask has not been received, then a decision 514 determines whether a file has been deleted. When the decision 514 determines that a file has been deleted (e.g., whether file deleted flag has been set), then a decision 516 determines whether the deleted file is in the file group being processed. When the decision 516 determines that the deleted file is in the file group, then the reference (e.g., pointer) to the deleted file and associated file items is removed 518 from the file group, thereby removing the data structure which associated the deleted file from the file group. Next, a decision 520 determines whether the file group is dynamic. When the decision 520 determines that the file group is dynamic, an update flag is set 522. Alternatively, when the decision 520 determines that the file group is not dynamic, the operation 522 is bypassed. On the other hand, when the decision 516 determines that the deleted file is not in the file group, then the operations 518-522 are bypassed. Hence, following the operation 522, or its being bypassed, the processing 308 returns to repeat the decision 502 and subsequent operations.

Still further, when the decision 514 determines that a file has not been deleted, then a decision 524 determines whether a new file has been added (e.g., whether a file added flag has been set). When the decision 524 determines that a new file has been added, then a decision 526 determines whether the file group being processed is dynamic. When the decision 526 determines that the file group is dynamic, then an update flag is set 528. Alternatively, when the decision 526 determines that the file group is not dynamic, then the operation 528 is bypassed. Following the operation 528 or its being bypassed, the processing 500 returns to the beginning of the processing 500 to repeat the decision 502 and subsequent operations.

Finally, a decision 532 determines whether the file group being processed is a dynamic file group. When the decision 532 determines that the file group is not dynamic, then a decision 534 determines whether the file group is being displayed. When the decision 534 determines that the file group is being displayed, then the file group is re-drawn 536 on the screen. Alternatively, when the decision 534 determines that the file group is not being displayed, the operation 536 is bypassed.

On the other hand, when the decision 532 determines that the file group is dynamic, then a decision 538 determines whether the update flag has been set. When the decision 538 determines that the update flag is set, then an idle update flag is set 540. Here, the idle update flag is a flag to indicate that during idle processing, the dynamic file group should be updated. By performing the updating to a dynamic file group in the idle processing, the somewhat intensive computations/processes being performed are able to be done in a background mode without impacting the user's perceived performance of the computing device. Alternatively, when the decision 538 determines that the update flag is not set, or following the operation 536 or the decision 534 when the file group is not dynamic, the processing 308 returns to repeat the decision 502 and subsequent operations.

Figure 6:
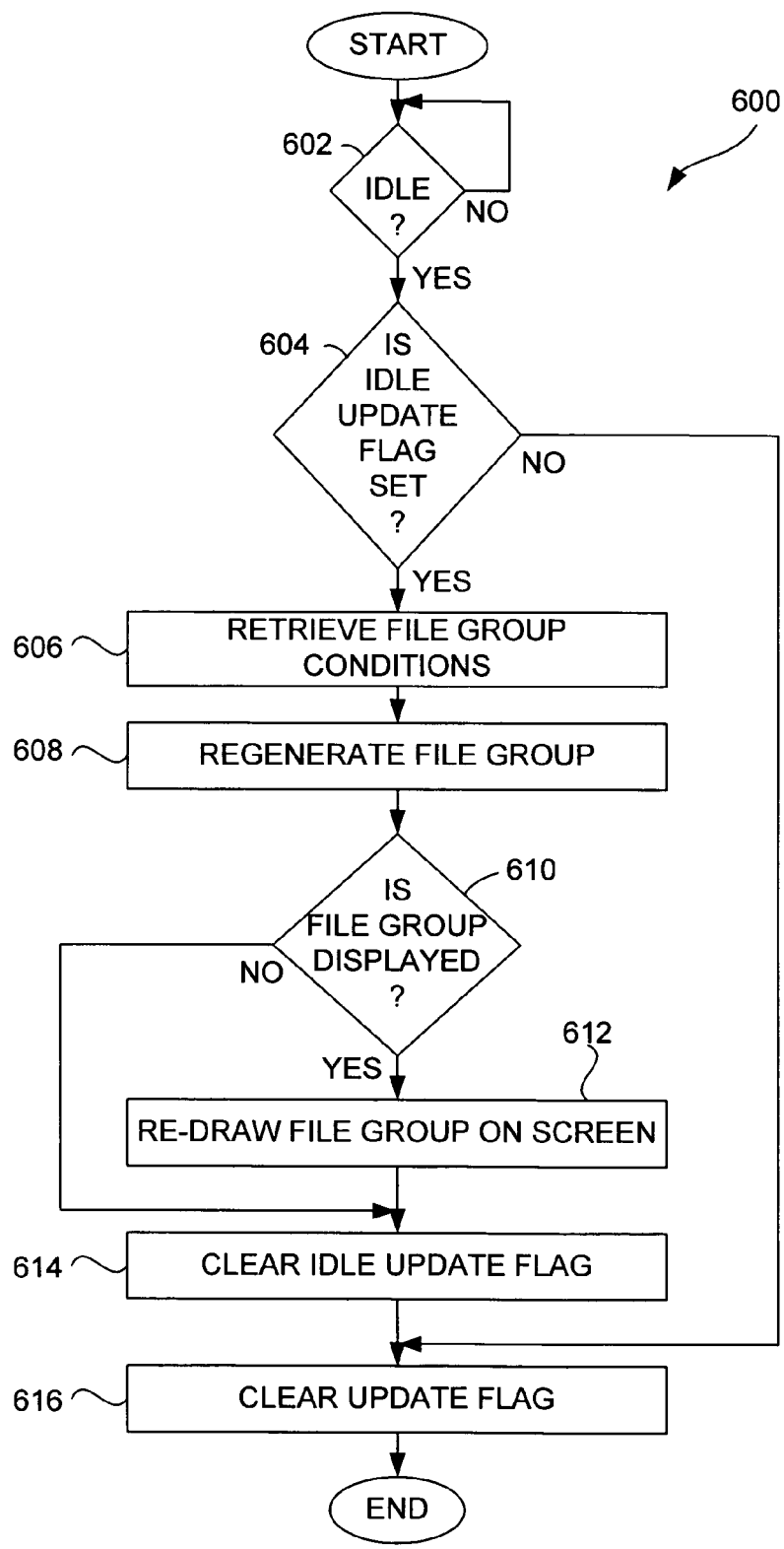
FIG. 6 is a flow diagram of idle update processing 600 according to one embodiment of the invention.

FIG. 6 is a flow diagram of idle update processing 600 according to one embodiment of the invention. The idle update processing 600 begins with a decision 602. The decision 602 determines whether the computing device is in an idle state. When the decision 602 determines that the computing device is not in an idle state, then the idle update processing 600 awaits such a state. In other words, the idle update processing 600 is invoked when the computing device reaches an idle state.

Once the computing device has reached an idle state, a decision 604 determines if the idle update flag is set. When the decision 604 determines that the idle update flag is set, file group conditions are retrieved 606. The file group conditions being retrieved 606 are associated with a particular file group that is being processed. After the file group conditions have been retrieved 606, the file group is regenerated 608. Next, a decision 610 determines if the file group is being displayed. When the decision 610 determines that the file group is being displayed, the file group is re-drawn 612 on the screen of the computing device. Alternatively, when the decision 610 determines that the file group is not being displayed, the operation 612 is bypassed. Following the operation 612, or its being bypassed, the idle update flag is cleared 614. Following the operation 614, as well as following the decision 604 when the idle update flag is not set, the update flag is cleared 616. After the update flag has been cleared 616, the idle update processing 600 is complete and ends.

The file groups are lists of particular file items. The particular file items for the file groups can be selected automatically using rules (e.g., file group conditions) or can be manually selected through user interaction with a graphical user interface. The file groups that have their file items selected by rules can be automatically updated (i.e., dynamic) when appropriate so as to maintain its compliance with the rules when the content of one or more of the files and therefore the associated file items available to the host computer change.

Figure 7A:
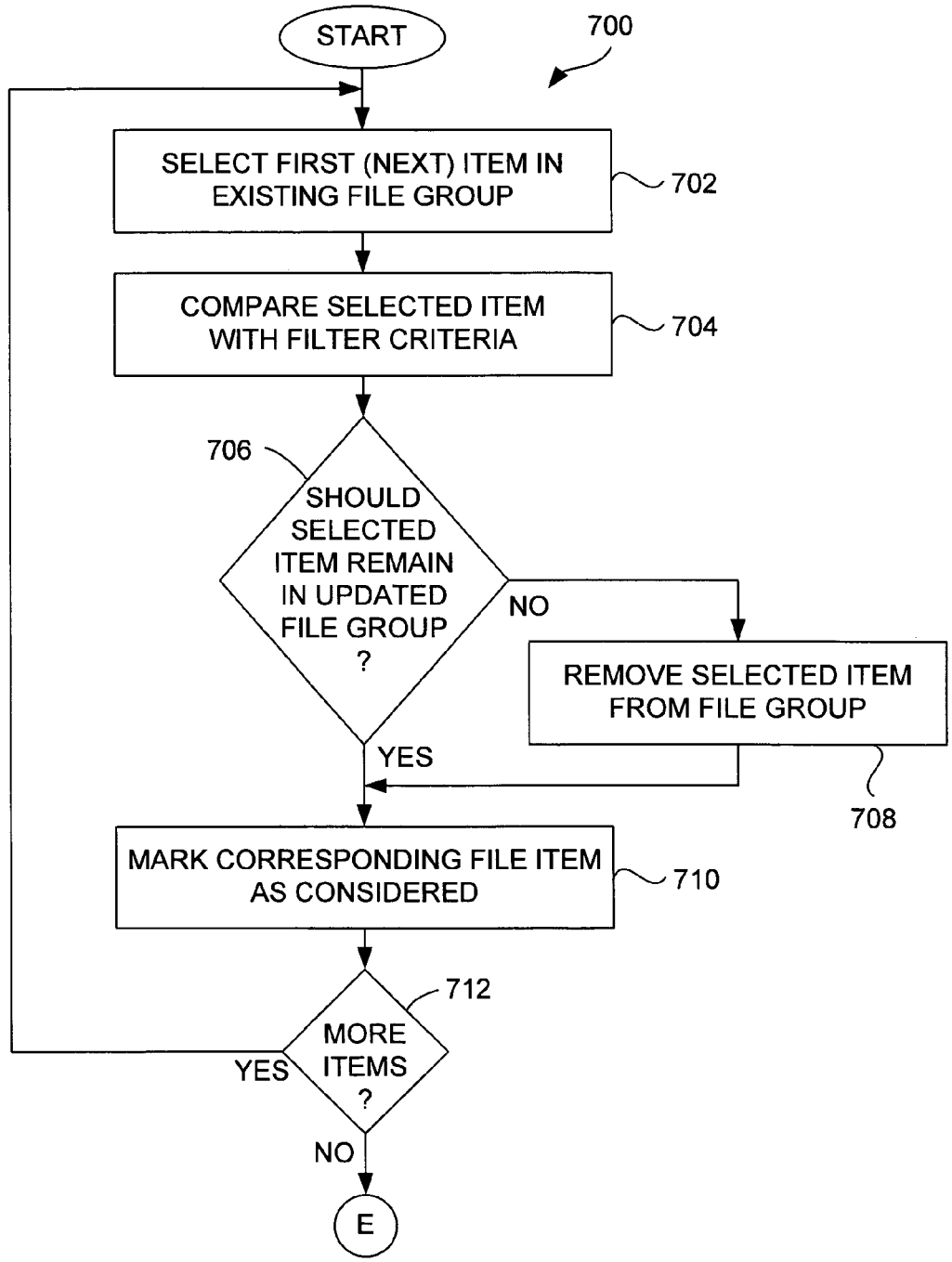
FIGS. 7A-7C are flow diagrams of regenerating a file group as shown at 308 of FIGS. 3A and 608 of FIG. 6 according to one embodiment of the invention.
Figure 7B:
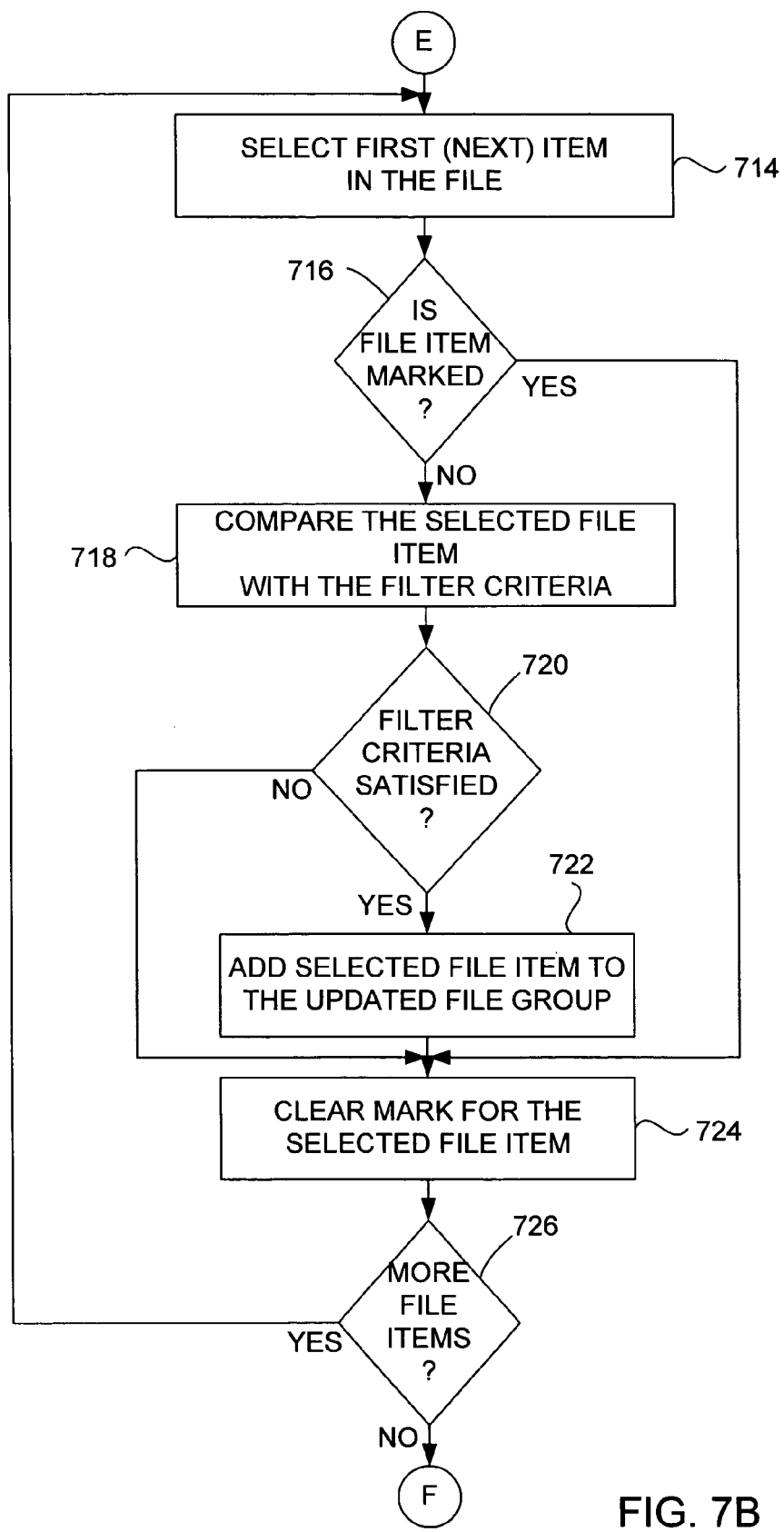
Figure 7C:
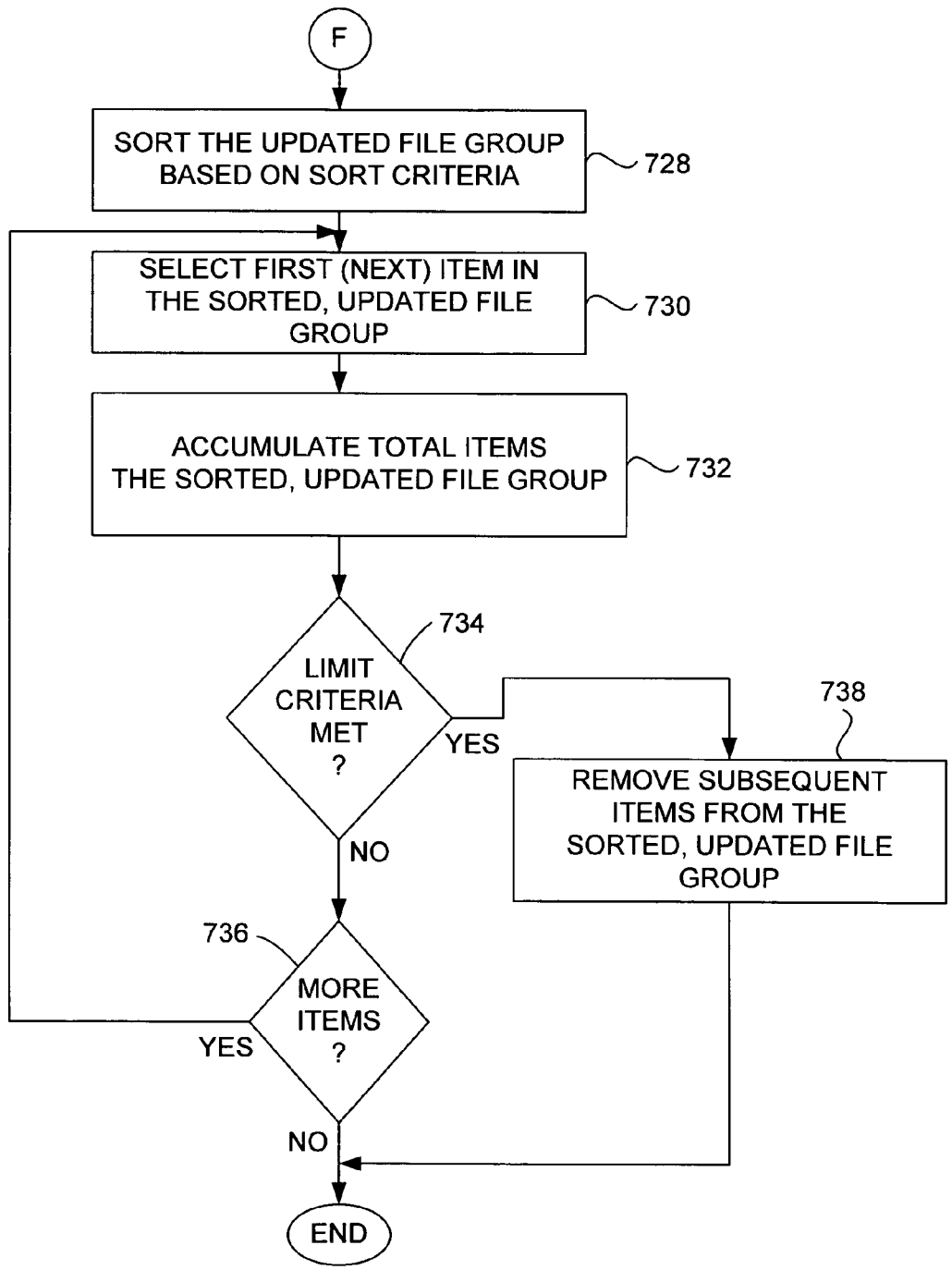

FIGS. 7A-7C are flow diagrams of regenerating a file group according to one embodiment of the invention. The regenerate file group processing 700 is, for example, processing performed by the regeneration 608 of the file group in FIG. 6 or the regeneration 308 of the file group illustrated in FIG. 3A.

The regenerate file group processing 700 begins by selecting 702 a first item in the existing file group that is being regenerated. Next, the selected item in the existing file group is compared 704 with filter criteria (or rules). The filter criteria and rules are a part of the file group conditions for the existing file group. Next, a decision 706 determines whether the selected item should remain in the updated file group. When the decision 706 determines that the selected item should not remain in the updated file group, then the selected item is removed 708 from the file group. On the other hand, when the decision 706 determines that the selected item should remain in the file group, then the file corresponding to the selected item is marked 710 as having been considered. Next, a decision 712 determines whether there are more items in the existing file group to be processed. When the decision 712 determines that there are more items in the existing file group to be considered, the regenerate file group processing 700 returns to repeat the operation 702 so that a next item in the existing file group can be selected.

Alternatively, when the decision 712 determines that there are no more items to be processed in the existing file group, additional processing is performed with respect to the remaining files. More particularly, a first item in a file is selected 714. Then, a decision 716 determines whether the selected item is marked. When the decision 716 determines that the selected item is not marked, then the selected item is compared 718 with the filter criteria or rules. A decision 720 then determines whether the filter criteria or rules are satisfied. When the decision 720 determines that the filter criteria or rules are satisfied, the selected item is added 722 to the updated file group. When the decision 720 determines that the filter criteria or rules are not satisfied, then the operation 722 is bypassed so that the selected item is not added to the updated file group. Further, when the decision 716 determines that the selected item is marked, then the operations 718-722 are bypassed because the particular item has already been processed and thus already either exists in the updated file group or has been removed therefrom.

Next, the mark for the selected item is cleared 724. Here, the mark may not have previously been set, but nevertheless the mark can be cleared 724 or this operation could be bypassed. A decision 726 then determines whether there are more items in the remaining files to be processed. When the decision 726 determines that there are more items in the remaining files to be processed, the regenerate file group processing 700 returns to repeat the operation 714 and subsequent operations.

On the other hand, when the decision 726 determines that there are no more items (e.g., no more files) to be processed, the updated file group is sorted 728 based on the sort criteria, if provided, which is another part of the file group conditions. After the updated file group has been sorted 728, a first item in the sorted, updated file group is selected 730. Then, one or more of total items and total sizes for the items in the sorted, updated file group are accumulated 732 as they are processed. A decision 734 then determines whether limit criteria has been met, which are also provided by the file group conditions, if present. In one embodiment, the limit criteria can include the sort criteria. When the decision 734 determines that the limit criteria has not been met, then a decision 736 determines whether there are more items in the sorted, updated file group to be processed. When the decision 736 determines that there are more items in the sorted, updated file group to be processed, the regenerate file group processing 700 returns to repeat the operation 730 and subsequent operations so that a next item can be selected and thereafter processed.

Alternatively, when the decision 734 determines that the limit criteria has been met, then all subsequent items are removed 738 from the sorted, updated file group. Here, the balance of the sorted, updated file group is removed therefrom as the limit criteria for the file group has been met. Following the operation 738 or following the decision 736 when there are no more items to be processed, the regenerate file group processing 700 is complete and ends.

As noted above, the file group conditions can provide filter criteria, sort criteria and limit criteria. These criteria can be used to select or filter the file information of file items. In one embodiment, the filter criteria might require a field of the file item information to include or not include a particular alphanumeric string (i.e., string comparison). In another embodiment, the filter criteria might require a field of the file item information include a numeric value less than, equal to, or greater than a particular numeric value (i.e., numeric comparison). In another embodiment, the filter criteria may specify a type of file (e.g., a file that includes errors or warnings). In one embodiment, the sort criteria might be random, alphabetical, or a most recently accessed or modified file, etc. In one embodiment, the limit criteria can be a numerical limit imposed on the length of the file. Alternatively, such a limit can be with respect to a file item. For example, the limit criteria could require that the file group be limited to twenty-five (25) file items.

Figure 8:
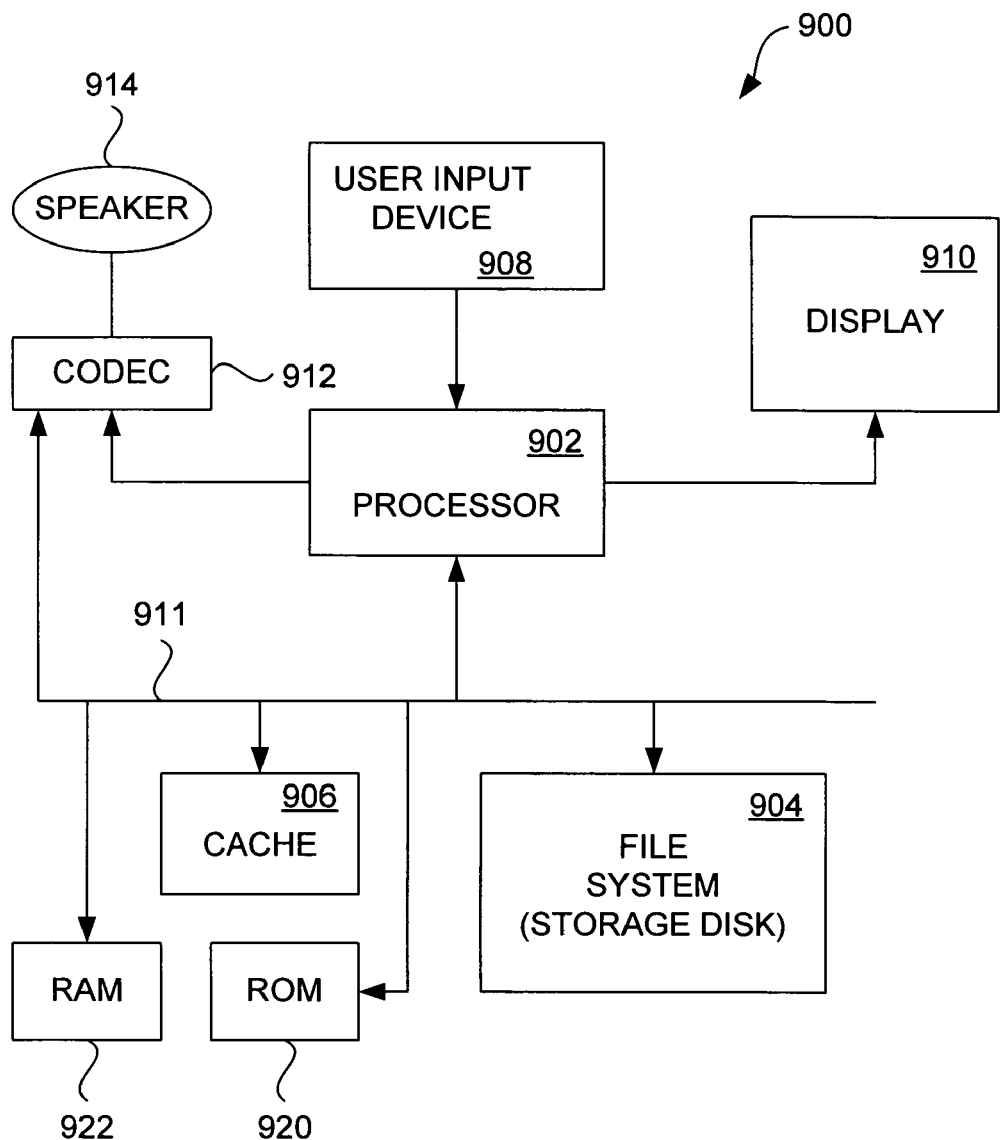
FIG. 8 is a block diagram of a personal computer 900 according to one embodiment of the invention.

FIG. 8 is a block diagram of a personal computer 900 according to one embodiment of the invention. The personal computer 900 includes a processor 902 that pertains to a microprocessor or controller. The personal computer 900 stores file information pertaining to file items in a file system 904 and a cache 906. The file system 904 is typically a storage disk or a plurality of disks. The file system 904 typically provides high capacity storage capabilities for personal computer 900. However, since the access time to the file system 904 is relatively slow, the personal computer 900 can also include a cache 906. The cache 906 is, for example, Random-Access Memory (RAM) provided by semiconductor memory. The relative access time to the cache 906 is substantially shorter than for the file system 904. However, the cache 906 does not have the large storage capacity of the file system 904. Further, the file system 904, when active, consumes more power than does the cache 906. The personal computer 900 may also include a RAM 920 and a Read-Only Memory (ROM) 922. The ROM 922 can store programs, utilities or processes to be executed in a non-volatile manner. The RAM 920 provides volatile data storage, such as for the cache 906.

The personal computer 900 also includes a user input device 908 that allows a user of the personal computer 900 to configure and select a file group via the personal computer 900. For example, the user input device 908 can take a variety of forms, such as a button, keypad, dial, etc. Still further, the personal computer 900 includes a display 910 (screen display) that can be controlled by the processor 902 to display information to the user. A data bus 911 can facilitate data transfer between at least the file system 904, the cache 906, the processor 902, and a coder/decoder (CODEC) 912.

In accordance with one embodiment, when a user selects a particular file group, a list of file group items is displayed on the display 910. Then, using the user input device 908, a user can elect to view, edit or execute a file corresponding to one of the displayed file items. The processor 902, upon executing a particular file, supplies any audio data to a coder/decoder (CODEC) 912. The CODEC 912 then produces analog output signals for a speaker 914.

In creating a file group, a user can interact with a graphical user interface. The graphical user interface can be provided by, or associated with, the project manager application that manages file items and their file groups. Such a software application can, for example, be provided by the project manager 106 illustrated in FIG. 1A, the project manager 156 illustrated in FIG. 1B, or the project manager application 202 illustrated in FIG. 2. The specifics of the graphical user interface can vary with implementation.

Figure 9A:
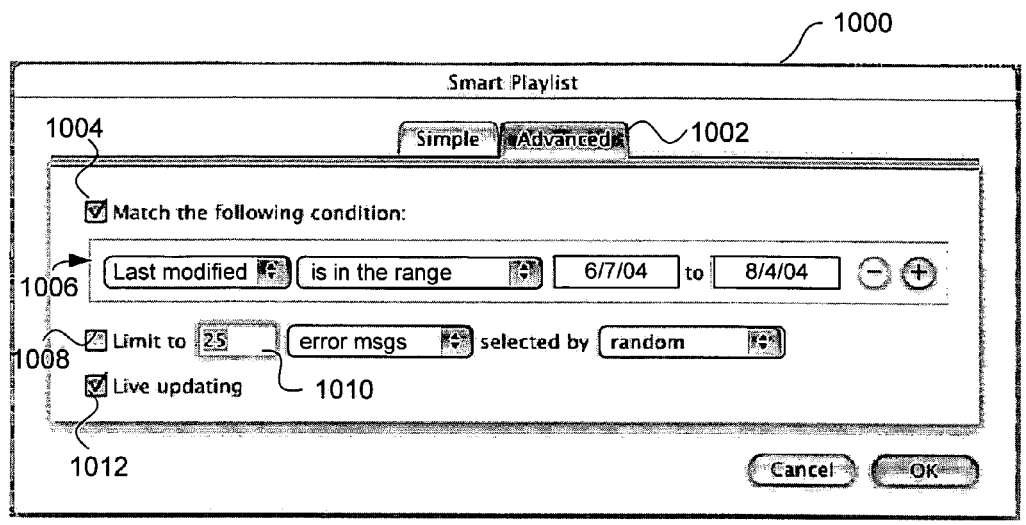
FIGS. 9A-9B are screen shots of exemplary graphical user interfaces for a user to create a file group.
Figure 9B:
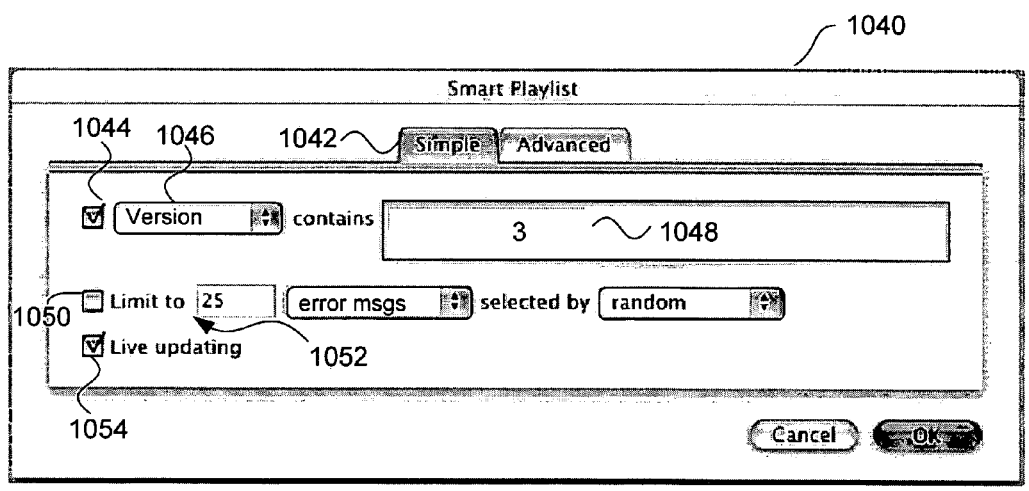

FIGS. 9A-9B are screen shots of exemplary graphical user interfaces for a user to create a file group. These exemplary graphical user interfaces define the rules or file group conditions for the file group to be created.

FIG. 9A is a screen shot of a first exemplary graphical user interface 1000. The first exemplary graphical user interface 1000 facilitates creation of a first file group using an advanced interface 1002. The advanced interface 1002 allows a user to enable filter conditions with a check box 1004. When the check box 1004 is checked, filter conditions can be established at a filter conditions entry region 1006. Typically, the filter conditions pertain to information associated with the file items. In one implementation, the information can be the fields of the file information of the file database shown in FIG. 3C. The advanced interface 1002 also allows the user to enable limit conditions with a check box 1008. When the check box 1008 is checked, limit conditions can be established at a limit condition entry region 1010. Although not enabled in this example, a limit condition can limit the number of file items or hits (e.g., error messages) in the resulting file group and also determine the manner in which the limiting should be performed. Still further, the advanced interface 1002 allows the user to enable live updating (i.e., dynamic updating) with a check box 1012. In this example, the live updating is enabled so that the resulting file group will be automatically updated as discussed in detail above.

FIG. 9B is a screen shot of a second exemplary graphical user interface 1040. The second exemplary graphical user interface 1040 facilitates creation of a second file group using a simple interface 1042. The simple interface 1042 is less complex than the advanced interface noted above. The simple interface 1042 allows a user to enable filter conditions with a check box 1044. When the check box 1044 is checked, filter conditions can be established by selecting a field from a list of fields 1046 and entering text into a text box 1048 to be contained within the selected field. For example, the fields can be those fields of the file information, such as the fields of the file item information of the file database shown in FIG. 3C. In the example shown in FIG. 9B, the selected field is "Version" and the entered text is "3." Hence, the resulting file group (e.g., Errors and Warnings) would include all file items (i.e., error messages) corresponding to version 3 of a particular project being tested. The simple interface 1042 also allows the user to enable limit conditions with a check box 1050. When the check box 1050 is checked, limit conditions can be established at a limit condition entry region 1052. Although not enabled in this example, the limit conditions can limit the number of file items in the resulting file group and can also determine the manner in which the limiting should be performed. Still further, the simple interface 1042 allows the user to enable live updating (i.e., dynamic updating) with a check box 1054. In this example, the live updating is enabled so that the resulting file group will be automatically updated as discussed in detail above.

A variety of searches and file groups may be implemented. For instance, a filter may be used to identify errors within a particular file (e.g., by identifying a specific file name). In other words, by creating a filter for the file group "Errors and Warnings," the errors and warnings for a particular specified file may be displayed. It is also contemplated that more complex searches may be implemented. For instance, the use of terms such as "AND" and "OR" may be used to form a more advanced search.

Figure 10:
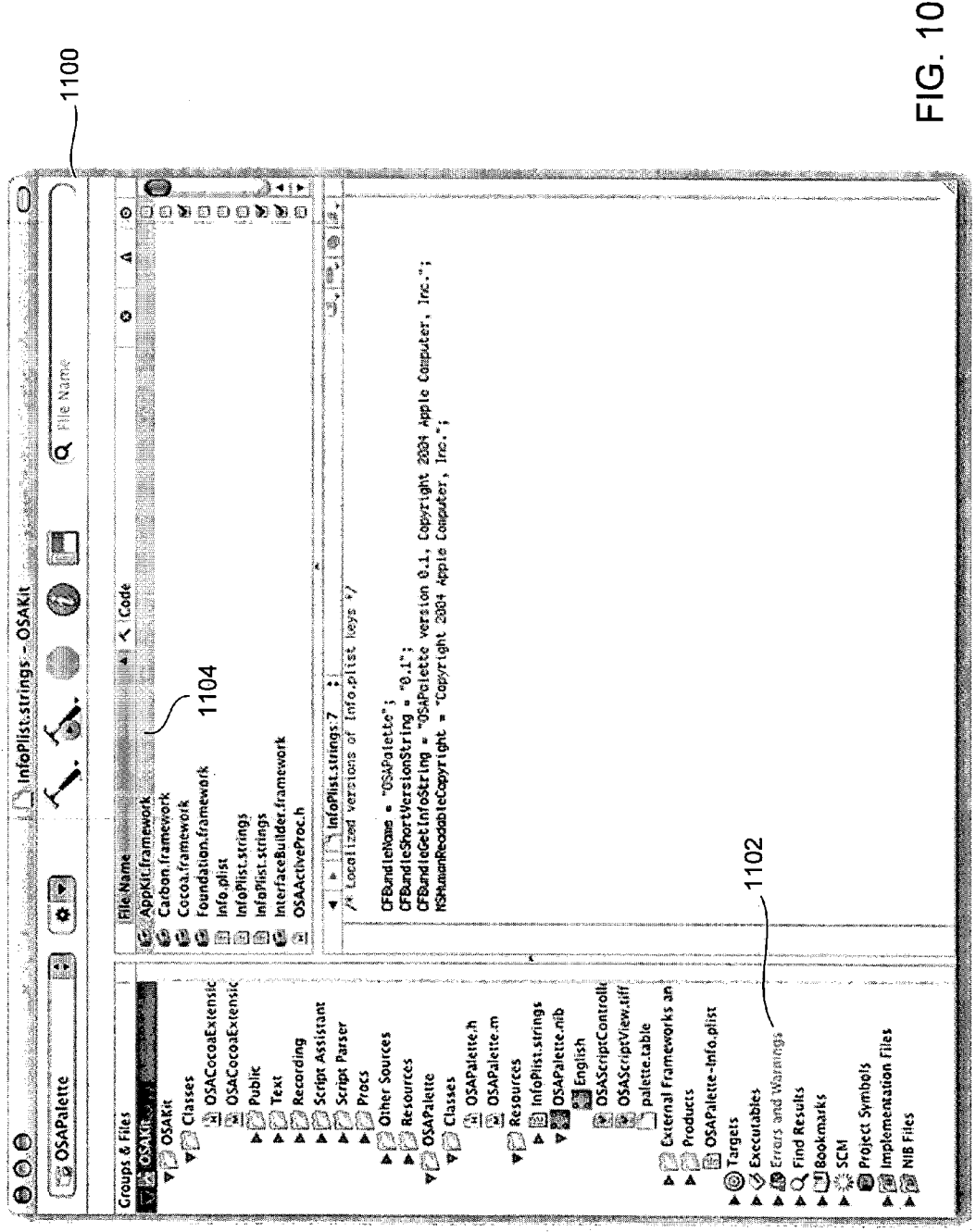
FIG. 10 is a screen shot of file items of an exemplary file group formed using the graphical user interface such as that shown in FIG. 9B.

FIG. 10 is a screen shot of file items of exemplary file groups formed using a graphical user interface 1020 such as that shown in FIG. 9B. In FIG. 10, a screen shot 1100 depicts a file group ("Errors and Warnings") as a source 1102 and a list 1104 of the file items in the file group. As an example of live (or dynamic) updating of the playlist ("Errors and Warnings"), assume that after the file group shown in FIG. 10 is created, the file ("AppKit.framework") is altered by correcting an error that was previously present. Hence, once these changes were made, the file items from the file ("AppKit.framework") no longer satisfy the file group conditions (e.g., filter criteria) for the file group ("Errors and Warnings"). Accordingly, following the automatic updating of the file group ("Errors and Warnings"), the updated file group no longer includes the file "AppKit.framework" file items, since execution errors are no longer generated.

The file group ("Errors and Warnings") may be altered after the automatic updating has been performed. For instance, the listing 1104 of the file items may no longer include any of the file items from file "AppKit.framework". This is achieved without any user actions to alter the file group.

Although the files of emphasis in several of the above embodiments described above are described as software files (e.g., source code or executables), it should be understood that the files and associated file items are not limited to an application developer environment. Moreover, the various aspects, embodiments, implementations or features of the invention can be used separately or in any combination.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that file groups are able to be updated so as to remain current with respect to available files and current file versions. Another advantage of the invention is that file groups are able to be automatically updated without user interaction. Still another advantage of the invention is that a graphical user interface can be used to assist a user in creating file groups that can be dynamically updated based on user-specified rules (e.g., filter, sort and limit criteria).

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method for automatically categorizing a file in a plurality of conditional personal computer file folders resident on a local personal computer in a software developer environment, said method comprising:
   determining whether a file has been altered; and
   automatically associating the file with each of the plurality of conditional persona l computer file folders resident on the local personal computer when the file satisfies a condition associated with a corresponding one of each of the plurality of conditional personal file folders and when the determining whether a file has been altered determines that the file has been altered,
   wherein at least one of the plurality of conditional personal computer file folders is an error file folder,
   wherein the error file folder contains one or more source code files with error conditions,
   wherein at least one of the error conditions is an error or warning resulting from compilation or execution of the corresponding source code file,
   wherein first and second conditions are respectively associated with first and second ones of the conditional personal computer file folders,
   wherein the first condition is different than the second condition, and
   wherein the automatically associating comprises automatically associating the file with the first one of the conditional personal computer file folders using the first condition, and automatically associating the file with the second one of the conditional personal computer files folders using the second condition.

2. The method as recited in claim 1, wherein the associating is performed in response to a user action.

3. The method as recited in claim 2, wherein the user action is a request to view information associated with one of the conditional personal computer file folders.

4. The method as recited in claim 1, further comprising:
   automatically removing the file from the first one of the conditional personal computer file folders when the file has been altered so as to violate the first condition; and
   automatically removing the file from the second one of the conditional personal computer file folders when the file has been altered so as to violate the second condition.

5. The method as recited in claim 1, wherein automatically associating the file with each of the plurality of conditional personal computer file folders when the determining whether a file has been altered determines that the file has been altered comprises:
   updating one or more conditional personal computer file folders to include the file.

6. The method as recited in claim 5, wherein updating one of the conditional personal computer file folders to include the file comprises:
   associating the file with the one or more conditional personal computer file folders.

7. The method as recited in claim 1, wherein determining whether a file has been altered is performed after the file has been compiled.

8. The method as recited in claim 1, wherein one or more conditional personal computer file folders with which the file is automatically associated are the one or more conditional personal computer file folders with which the file was previously associated.

9. The method as recited in claim 8, wherein one or more conditional personal computer file folders with which the file is automatically associated is a subset of one or more conditional personal computer file folders with which the file was previously associated.

10. The method as recited in claim 8, wherein one or more conditional personal computer file folders with which the file is automatically associated is a superset of one or more conditional personal computer file folders with which the file was previously associated.

11. The method as recited in claim 1, wherein automatically associating the file with conditional personal computer file folders when the determining whether a file has been altered determines that the file has been altered comprises:
   removing the file from one or more conditional personal computer file folders.

12. The method as recited in claim 1, wherein automatically associating the file with conditional personal computer file folders when the determining whether a file has been altered determines that the file has been altered comprises:

adding the file to one or more conditional personal computer file folders.

13. The method as recited in claim 1, wherein automatically associating the file with conditional personal computer file folders when the determining whether a file has been altered determines that the file has been altered comprises:
    removing the file from a first set of one or more conditional personal computer file folders; and
    adding the file to a second set of one or more conditional personal computer file folders.

14. The method as recited in claim 1, wherein automatically associating the file with conditional personal computer file folders when the determining whether a file has been altered determines that the file has been altered comprises:
    automatically associating the file with one or more conditional personal computer file folders when the determining whether a file has been altered determines that the content of the file has been altered.

15. A computer-implemented method for automatically categorizing a file in one or more conditional file folders in a software developer environment, said method comprising:
    determining whether a file has been altered, the file having a first set of one or more conditional file folders associated therewith; and
    regenerating one or more of the one or more conditional file folders when the file satisfies a condition associated with a corresponding one of each of the plurality of conditional file folders and when the determining whether a file has been altered determines that the file has been altered such that the file has a second set of one or more conditional file folders associated therewith,
    wherein at least one of the plurality of conditional file folders is an error file folder,
    wherein the error file folder contains one or more source code files with error conditions,
    wherein at least one of the error conditions is an error or warning resulting from compilation or execution of the corresponding source code file,
    wherein first and second conditions are respectively associated with first and second ones of the conditional file folders,
    wherein the first condition is different than the second condition, and
    wherein the regenerating comprises automatically associating the file with the first one of the conditional file folders using the first condition, and automatically associating the file with the second one of the conditional file folders using the second condition.

16. A computer-implemented method as recited in claim 15, wherein said method further comprises:
    determining whether one of the one or more conditional file folders is affected by the alteration of the content of the file.

17. A computer-implemented method as recited in claim 15, wherein said method further comprises:
    determining whether the first set of one or more conditional file folders associated with the file is affected by the alteration of the content of the file.

18. A computer-implemented method as recited in claim 17, wherein said regenerating is performed only when said determining determines that the content of the file has been altered and when said determining determines that one or more conditional file folders is affected by the alteration to the content of the file.

19. A computer-implemented method as recited in claim 15, wherein each of the conditional file folders has at least one condition associated therewith, and
    wherein said regenerating operates to regenerate one or more of the conditional file folders using the at least one condition associated therewith.

20. A computer-implemented method as recited in claim 15, wherein said method further comprises:
    subsequently displaying at least one of the conditional file folders after said regenerating.

21. A computer-implemented method as recited in claim 15, wherein said method further comprises:
    re-drawing a selected one of the conditional file folders after said regenerating when the selected one of the conditional file folders is already being displayed.

22. A computer-implemented method as recited in claim 15, wherein at least one of the conditional file folders has conditions associated therewith, the conditions including at least one filter criteria, and
    wherein said regenerating operates to regenerate at least one of the conditional file folders using the at least one filter criteria.

23. A computer-implemented method as recited in claim 22, wherein the conditions further include sort criteria.

24. A computer-implemented method as recited in claim 15, wherein at least one of the conditional file folders has conditions associated therewith, the conditions including at least one filter criteria and at least one limit criteria, and
    wherein said regenerating operates to regenerate the at least one of the conditional file folders using the at least one filter criteria and the at least one limit criteria.

25. A computer-implemented method as recited in claim 15, wherein the file has one or more column items associated therewith.

26. A computer-implemented method as recited in claim 25, further comprising:
    generating at least one of the column items after the file is altered.

27. A computer-implemented method as recited in claim 25, further comprising:
    generating at least one of the column items after the file has been compiled.

28. A computer-implemented method as recited in claim 25, wherein the one or more column items include a line number and an error message.

29. A computer-implemented method as recited in claim 25, wherein the one or more column items includes a file type.

30. A computer-implemented method as recited in claim 15, wherein each of the conditional file folders has one or more column header items associated therewith.

31. A computer-implemented method as recited in claim 30, wherein an indication of a set of one or more of the column header items that are visible is associated with each of the conditional file folders.

32. A computer-implemented method as recited in claim 31, wherein the file has one or more column items associated therewith.

33. A computer-implemented method as recited in claim 32, wherein regenerating one or more of the set of one or more conditional file folders comprises:
    displaying at least one of the conditional file folders after the regenerating.

34. A computer-implemented method as recited in claim 33, wherein displaying one of the conditional file folders after the regenerating comprises:
    identifying the set of one or more column header items that are visible; and displaying a set of the column items for each file associated with the one of the conditional file folders, the set of the column items corresponding to the set of one or more column header items that are visible.

35. A computer-implemented method for automatically categorizing a file in a plurality of conditional personal computer file folders that includes at least an error file folder, said method comprising:

determining whether a file has been altered;

automatically associating the file with the error file folder of the plurality of conditional personal computer file folders when the file satisfies an error condition of the error file folder, and when the determining whether a file has been altered determines that the file has been altered, wherein the error file folder contains source code files with error conditions, and wherein at least one of the error conditions is an error or warning resulting from compilation or execution of the corresponding source code file; and automatically associating the file with at least an additional one of the plurality of conditional personal computer file folders when the file satisfies a condition of the additional one of the plurality of conditional personal computer file folders, and when the determining whether a file has been altered determines that the file has been altered, wherein first and second conditions are respectively associated with first and second ones of the conditional personal computer file folders, wherein the first condition is different than the second condition, and wherein the automatically associating comprises (i) automatically associating the file with the first one of the conditional personal computer file folders using the first condition, and (ii) automatically associating the file with the second one of the conditional personal computer file folders using the second condition.

\* \* \* \* \*